United States Patent
Yasuda et al.

(10) Patent No.: US 10,587,301 B2
(45) Date of Patent: Mar. 10, 2020

(54) WIRELESS COMMUNICATIONS MODULE

(71) Applicant: ROHM CO., LTD., Kyoto-shi, Kyoto (JP)

(72) Inventors: Masahiro Yasuda, Kyoto (JP); Tomohiro Ikuta, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/310,169

(22) PCT Filed: May 8, 2015

(86) PCT No.: PCT/JP2015/063291
§ 371 (c)(1),
(2) Date: Nov. 10, 2016

(87) PCT Pub. No.: WO2015/174337
PCT Pub. Date: Nov. 19, 2015

(65) Prior Publication Data
US 2017/0155420 A1    Jun. 1, 2017

(30) Foreign Application Priority Data

May 12, 2014 (JP) .................................. 2014-098483
May 7, 2015 (JP) .................................. 2015-094744

(51) Int. Cl.
*H04B 1/40* (2015.01)
*H01Q 1/24* (2006.01)
(Continued)

(52) U.S. Cl.
CPC ............ *H04B 1/40* (2013.01); *H01Q 1/2283* (2013.01); *H01Q 1/24* (2013.01); *H01Q 1/243* (2013.01);
(Continued)

(58) Field of Classification Search
CPC ..................................................... H04Q 1/48
See application file for complete search history.

(56) References Cited

U.S. PATENT DOCUMENTS

| 8,356,758 B1* | 1/2013 | Cok | G06K 19/0717 |
| | | | 235/492 |
| 2005/0040905 A1* | 2/2005 | Hatanaka | H03L 1/04 |
| | | | 331/176 |

(Continued)

FOREIGN PATENT DOCUMENTS

| JP | 9-17518 A | 1/1997 |
| JP | 9-18434 A | 1/1997 |

(Continued)

OTHER PUBLICATIONS

International Search Report issued in PCT/JP2015/063291, dated Aug. 11, 2015.

*Primary Examiner* — Yuwen Pan
*Assistant Examiner* — Fatuma G Sherif
(74) *Attorney, Agent, or Firm* — Hamre, Schumann, Mueller & Larson, P.C.

(57) ABSTRACT

A wireless communications module of the present invention includes a wireless communication control unit and a plurality of external connection terminals. At least any one of the plurality of external connection terminals and the wireless communication control unit are connected via a communication frequency component removing element.

49 Claims, 22 Drawing Sheets

(51) Int. Cl.
*H01Q 1/22* (2006.01)
*H01Q 1/36* (2006.01)
*H01Q 9/42* (2006.01)
*H01Q 1/38* (2006.01)
*H01Q 1/48* (2006.01)

(52) U.S. Cl.
CPC ............... *H01Q 1/36* (2013.01); *H01Q 1/38* (2013.01); *H01Q 1/48* (2013.01); *H01Q 9/42* (2013.01)

(56) References Cited

U.S. PATENT DOCUMENTS

| | | | | |
|---|---|---|---|---|
| 2005/0136850 | A1* | 6/2005 | Arai | H04B 1/525 455/88 |
| 2005/0242961 | A1* | 11/2005 | Shibata | B60N 5/00 340/572.7 |
| 2006/0103485 | A1* | 5/2006 | Okuyama | H01P 1/15 333/132 |
| 2008/0143602 | A1* | 6/2008 | Mak | H01Q 3/24 342/374 |
| 2010/0148928 | A1* | 6/2010 | Yeager | G06K 19/077 340/10.1 |
| 2010/0237967 | A1* | 9/2010 | Ueno | H01L 21/312 333/246 |
| 2011/0234295 | A1* | 9/2011 | Uejima | H03H 7/38 327/407 |

FOREIGN PATENT DOCUMENTS

| | | |
|---|---|---|
| JP | 2000-331203 A | 11/2000 |
| JP | 2004-281844 A | 10/2004 |
| JP | 2006-121633 A | 5/2005 |
| JP | 2008-219412 A | 9/2008 |
| JP | 2012-178645 A | 9/2012 |
| JP | 2014-20998 A | 2/2014 |

* cited by examiner

WIRELESS COMMUNICATIONS MODULE

TECHNICAL FIELD

The present invention relates to a wireless communications module.

BACKGROUND ART

A wireless communications module has been adopted as a module that constitutes various electronic apparatuses represented by communication equipment and the like. An example of a conventional wireless module is disclosed in PTL 1. The wireless module disclosed in PTL 1 includes a wireless communication control unit and a substrate that supports the wireless communication control unit. Also, an antenna portion connected to the wireless communication control unit is formed in the substrate.

In wireless communication performed by using the wireless communications module, it is required that a radio wave having a predetermined frequency of the adopted communication standard is efficiently transmitted and received. Therefore, it is preferable that the intensity of the radio wave to be transmitted from the antenna portion is as large as possible relative to the power being input for generating the radio wave. Also, if an unintended radio wave that belongs to a frequency band in the vicinity of the predetermined frequency is received, the unintended radio wave becomes a noise radio wave that hinders wireless communication. Therefore, it is preferable that the wireless communication control unit is prevented from receiving a noise radio wave as much as possible. However, the method for effectively receiving a radio wave differs depending on factors such as the frequency band to which the predetermined frequency belongs, the intensity of the radio wave used for the wireless communication, and furthermore the size of the wireless communications module. Accordingly, if an appropriate method is not applied, the wireless communication may rather become unstable.

CITATION LIST

Patent Literature

PTL 1: JP 2006-121633A

SUMMARY OF INVENTION

Technical Problem

The present invention has been proposed under the above circumstances, and has an object to provide a wireless communications module that enables stable wireless communication.

Solution to Problem

A wireless communications module provided by the present invention includes a wireless communication control unit, and a plurality of external connection terminals. At least one of the plurality of external connection terminals and the wireless communication control unit are connected via a communication frequency component removing element.

In a preferable embodiment of the present invention, all of the plurality of external connection terminals and the wireless communication control unit are connected via communication frequency component removing elements.

In a preferable embodiment of the present invention, each communication frequency removing element is an inductor.

In a preferable embodiment of the present invention, the external connection terminals and each communication frequency removing element are connected without an electronic element being interposed.

A preferable embodiment of the present invention is provided with a connector portion that includes the plurality of external connection terminals and a case that houses these external connection terminals.

In a preferable embodiment of the present invention, the communication frequency removing element is arranged adjacent to the connector portion.

A preferable embodiment of the present invention is provided with an antenna portion that is connected to the wireless communication control unit.

A preferable embodiment of the present invention is provided with an external antenna connection end portion for connecting an external antenna.

A preferable embodiment of the present invention is provided with an external antenna connection portion for connecting the antenna portion to an external antenna. When the external antenna is connected to the external antenna connection portion, the antenna portion and the wireless communication control unit are insulated.

A preferable embodiment of the present invention is provided with a wireless communication control unit substrate on which the wireless communication control unit is mounted.

In a preferable embodiment of the present invention, a maximum length of the wireless communication control unit substrate is smaller than a quarter of a communication wavelength of the wireless communication control unit.

A preferable embodiment of the present invention is provided with a support substrate having an obverse surface and a reverse surface. The wireless communication control unit substrate is mounted on the obverse surface of the support substrate.

In a preferable embodiment of the present invention, a maximum length of the support substrate is smaller than a quarter of a communication wavelength of the wireless communication control unit.

In a preferable embodiment of the present invention, the antenna portion includes a conductor pattern formed on the reverse surface of the support substrate.

In a preferable embodiment of the present invention, the conductor pattern is grounded.

In a preferable embodiment of the present invention, the antenna portion includes a through-hole conductor portion that passes through the support substrate in a thickness direction and is electrically connected to the conductor pattern.

In a preferable embodiment of the present invention, the conductor pattern is electrically connected to only a single part of the through-hole conductor portion.

In a preferable embodiment of the present invention, only the conductor pattern is formed on the reverse surface of the support substrate.

In a preferable embodiment of the present invention, the conductor pattern similar in shape to the support substrate in plan view.

In a preferable embodiment of the present invention, the conductor pattern has a band shape.

In a preferable embodiment of the present invention, the conductor pattern includes a bent portion.

In a preferable embodiment of the present invention, the antenna portion includes an inductor having one end connected to the conductor pattern.

In a preferable embodiment of the present invention, the connector portion includes a plurality of internal connection terminals that are electrically connected to the plurality of external connection terminals, respectively, and each communication frequency removing element is arranged close to the plurality of internal connection terminals.

In a preferable embodiment of the present invention, the wireless communication control unit includes a transmission terminal for performing transmission in wireless communication and a reception terminal for performing reception in wireless communication, and the plurality of internal connection terminals includes an internal connection terminal for transmission that is electrically connected to the transmission terminal, an internal connection terminal for reception that is electrically connected to the reception terminal, an internal connection terminal for power supply that is to be connected to an external power supply line, and an internal connection terminal for ground to be connected to a ground line.

In a preferable embodiment of the present invention, each communication frequency removing element is provided close to each of the internal connection terminal for transmission, the internal connection terminal for reception, the internal connection terminal for power supply, and the internal connection terminal for ground.

In a preferable embodiment of the present invention, the internal connection terminal for transmission and the internal connection terminal for reception are arranged between the internal connection terminal for power supply and the internal connection terminal for ground.

In a preferable embodiment of the present invention, the internal connection terminal for transmission is arranged close to the internal connection terminal for ground, and the internal connection terminal for reception is arranged close to the internal connection terminal for power supply.

In a preferable embodiment of the present invention, the plurality of internal connection terminals include one or more dummy internal connection terminals that are not connected to the wireless communication control unit.

In a preferable embodiment of the present invention, the one or more dummy internal connection terminals are arranged between the internal connection terminal for ground and the internal connection terminal for transmission.

In a preferable embodiment of the present invention, the plurality of internal connection terminals include a plurality of the dummy internal connection terminals.

In a preferable embodiment of the present invention, the antenna portion includes a conductor pattern having a band shape.

In a preferable embodiment of the present invention, the conductor pattern includes one or more discontinuous portions that cut off electrical connection in a length direction.

A resistor that extends a conductor length of the conductor pattern by being mounted across the discontinuous portion is included.

Other features and advantages of the present invention will become more apparent from the detailed description given below with reference to the attached drawings.

DESCRIPTION OF EMBODIMENTS

Hereinafter, preferable embodiments of the present invention will be specifically described with reference to the drawings.

Figure 1:
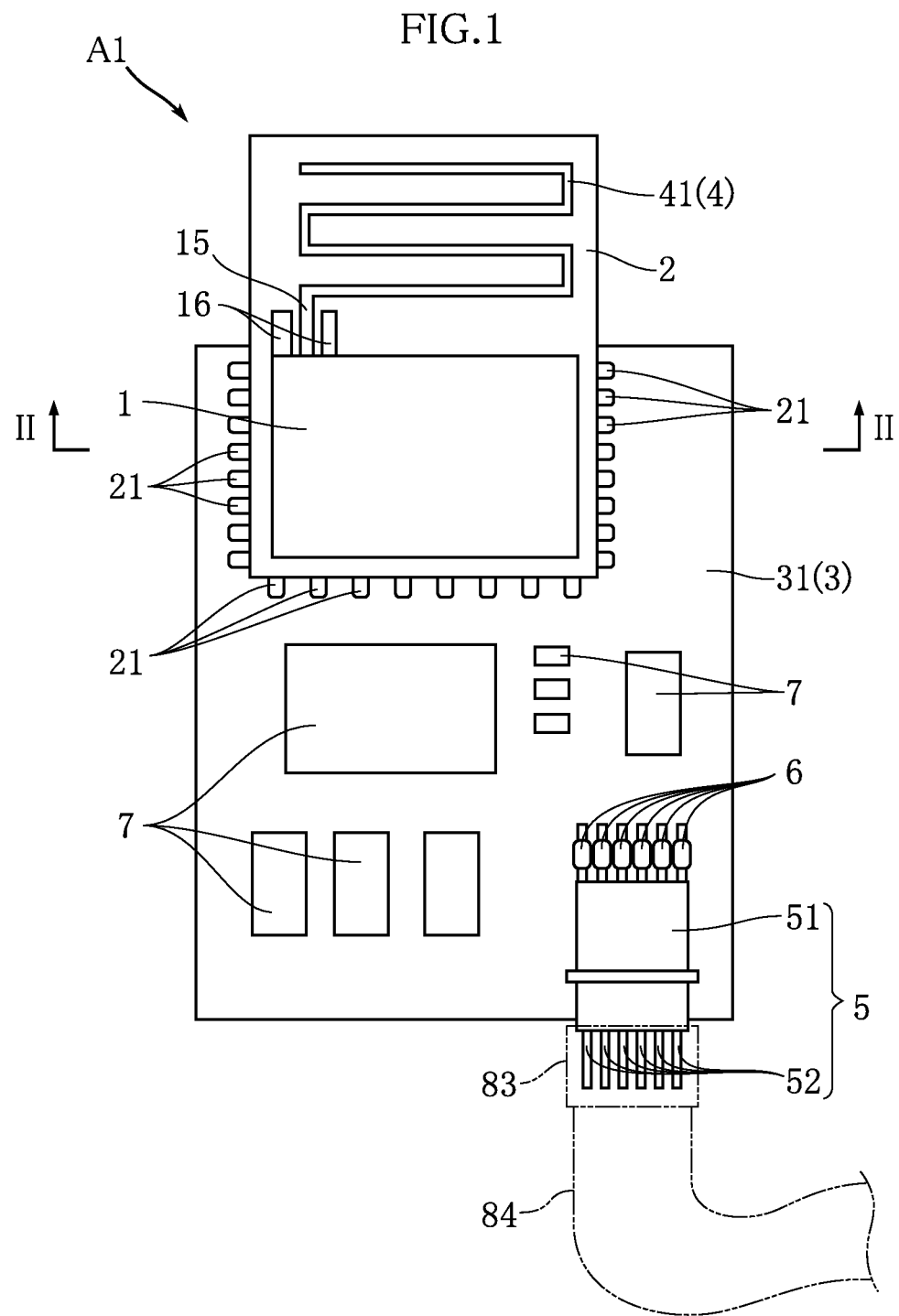
FIG. 1 is a plan view illustrating a wireless communications module based on a first embodiment of the present invention.
Figure 2:
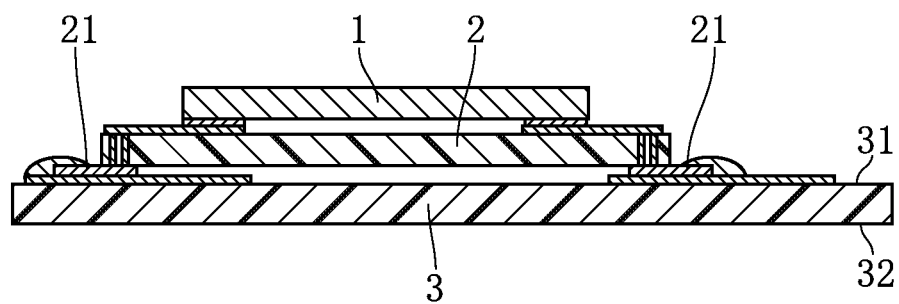
FIG. 2 is a cross-sectional view taken along line II-II in FIG. 1.

FIGS. 1 and 2 illustrate a wireless communications module based on a first embodiment of the present invention. A wireless module A1 of the present embodiment includes a wireless communication control unit 1, a wireless communication control unit substrate 2, a support substrate 3, an antenna portion 4, a connector portion 5, and a plurality of inductors 6.

FIG. 1 is a plan view illustrating the wireless module A1. FIG. 2 is a cross-sectional view taken along line II-II in FIG. 1.

The wireless module A1 is a module that is to be mounted on various electronic apparatuses and realizes wireless communication in an electronic apparatus when mounted thereon. The application of the wireless communications module according to the present invention and the wireless communication standard to which the wireless communications module conforms is not specifically limited. In the following description, a case where a wireless communication standard in which a radio wave that belongs, in general, to a medium wave category, belongs to a category on a relatively long wave side as a communication application of electronic apparatuses, and is relatively weak in intensity is used is adopted will be described as an example. Wi-SUN, for example, is an example of such a wireless communication standard.

Wi-SUN has a physical layer specification of IEEE 802.15.4g, and is established to realize low power and highly efficient wireless communication. Mounting to meter reading devices for infrastructures such as electricity, gas, and water is an application example of the wireless communications module A1 conforming to Wi-SUN. The above-mentioned infrastructures can be effectively operated using transmitting data taken by inspection devices from the wireless module A1. The communication frequency in the wireless module A1 is 1 GHz or less, and is 920 MHz, for example. In this case, the wavelength of the radio wave is approximately 326 mm, and a quarter wavelength thereof is approximately 81 mm.

The wireless communication control unit 1 performs overall control on the wireless communication by the wireless module A1, and is mounted on the wireless communication control unit substrate 2. A configuration example of the wireless communication control unit 1 includes a radio frequency circuit (hereinafter referred to as RF circuit) and a microcomputer.

The RF circuit is a circuit that transmits and receives a wireless signal using a radio wave. The microcomputer is an integrated circuit that performs predetermined processing on an output from the RF circuit. The specific mode of the wireless communication control unit 1 is variously set, and is not specifically limited. A configuration may be adopted in which an IC that constitutes the RF circuit and an IC that constitutes the microcomputer are mounted on the wireless communication control unit substrate 2. Alternatively, either of the RF circuit and the microcomputer may be configured by a wiring pattern formed in the wireless communication control unit substrate 2 and a predetermined electronic element (neither are shown). Furthermore, the configuration may be such that the RF circuit and the microcomputer are integrated in one IC. Note that, from a viewpoint of noise prevention, a cover made of metal, for example, that covers the whole or a portion of the wireless communication control unit 1 may be included.

The wireless communication control unit substrate 2 includes the wireless communication control unit 1 mounted thereon, supports the wireless communication control unit 1, and constitutes conduction paths that are electrically connected to the wireless communication control unit 1. The wireless communication control unit substrate 2 is made of glass epoxy resin, for example, and includes a wiring pattern made of a metal that is highly conductive such as Cu. In the present embodiment, the antenna portion 4 is formed in the wireless communication control unit substrate 2. Also, in the present embodiment, the wireless communication control unit substrate 2 has a rectangular shape in plan view. The diagonal line length that is the maximum length of the wireless communication control unit substrate 2 is smaller than the above-described quarter wavelength (81 mm).

The antenna portion 4 is a portion that transmits (or receives) a radio wave in wireless communication by the wireless communication control unit 1. In the present embodiment, the antenna portion 4 is constituted by a conductor pattern 41 that is a portion of the wiring pattern in the wireless communication control unit substrate 2. The total length of the conductor pattern 41 of the antenna portion 4 is preferably set to approximately the above-described quarter wavelength, for example, in order to appropriately secure transmission and reception sensitivity of the antenna portion 4. In the present embodiment, the length of the conductor pattern 41 is made to be approximately the quarter wavelength by forming the conductor pattern 41 in a band shape having a plurality of bent portions.

One end of the conductor pattern 41 of the antenna portion 4 is connected to a feeding point 15. The feeding point 15 is a portion for supplying power to the conductor pattern 41 of the antenna portion 4 when a radio wave is transmitted from the antenna portion 4 in order to transmit a wireless signal from the wireless communication control unit 1, for example. In the present embodiment, the feeding point 15 is a portion interposed between a pair of ground patterns 16 of the wiring pattern in the wireless communication control unit substrate 2. Each ground pattern 16 is a part of the wiring pattern that is grounded.

In the present embodiment, the wireless communication control unit substrate 2 includes a plurality of mounting terminals 21. Mounting terminals 21 are each made of Cu, Ni, or an alloy of Cu and Ni, and protrude from end edges of the wireless communication control unit substrate 2. The plurality of mounting terminals 21 fix the wireless communication control unit substrate 2 to the support substrate 3 as a result of being joined to the support substrate 3 by solder, for example, and constitutes conduction paths between the wireless communication control unit substrate 2 and the support substrate 3.

The support substrate 3, on which the wireless communication control unit substrate 2 is mounted, supports the wireless communication control unit substrate 2, and constitutes conduction paths that are electrically connected to the wireless communication control unit substrate 2. The support substrate 3 includes an obverse surface 31 and a reverse surface 32 that face opposite directions to each other.

The wireless communication control unit substrate 2 is mounted on the obverse surface 31. The support substrate 3 is made of a glass epoxy resin, for example, and includes a wiring pattern made of a metal that is highly conductive such as Cu. Also, in the present embodiment, the support substrate 3 has a rectangular shape in plan view. The diagonal line length that is the maximum length of the support substrate 3 is smaller than the above-described quarter wavelength (81 mm).

The wireless communication control unit substrate 2 is mounted on the support substrate 3 closer to one end thereof, and a portion of the wireless communication control unit substrate 2 protrudes from the support substrate 3, in the present embodiment. The portion of the wireless communication control unit substrate 2 that protrudes from the support substrate 3 is a portion in which the conductor pattern 41 of the antenna portion 4 is formed.

A plurality of electronic elements 7 are mounted on the support substrate 3. The plurality of electronic elements 7 are mounted, on the obverse surface 31, to the wiring pattern.

The connector portion 5 is for connecting the wireless module A1 to an electronic apparatus such as a meter reading device. The connector portion 5 includes a case 51 and a plurality of external connection terminals 52. The case 51 is made of a white resin, for example, and houses the plurality of external connection terminals 52. Also, the case 51 is fixed to the obverse surface 31 of the support substrate 3. The plurality of external connection terminals 52 are respectively electrically connected and fixed to appropriate portions of the wiring pattern of the support substrate 3. That is, the plurality of external connection terminals 52 are connected to the wireless communication control unit 1 via the wiring pattern of the support substrate 3 and the plurality of electronic elements 7.

An external connector 83 is connected to the connector portion 5, for example. The external connector 83 includes a case made of resin, for example, and a plurality of terminals (not shown) housed in the case. An external harness 84 is connected to the external connector 83. The external harness 84 includes a plurality of core wires and a coating resin that covers the core wires. These core wires are respectively connected to the plurality of terminals of the external connector 83. The external harness 84 is connected to a control unit, a power supply unit, and the like that are to transmit and receive signals and power to and from the wireless module A1, in an electronic apparatus such as a meter reading device.

The plurality of inductors 6 corresponds to one example of a communication frequency component removing element in the present invention. Each inductor 6 has a function in which a current having a communication frequency in the wireless communication control unit 1 is selectively removed and a current in the other frequency bands and a DC current are allowed to flow. Note that the communication frequency component removing element is not limited to the inductor 6, and may be any other means that can remove a current in a desired frequency band, and that may be constituted by using capacitors and resistors, for example.

Specific examples of the inductor 6 are as follows. In the case where the frequency of wireless communication by the wireless communication control unit 1 is 920 MHz, for example, the inductor 6 having the following inductance is selected according to the specific structure (type) of the inductor 6. In the case of a wire wound type having a non-magnetic core, the inductance 6 is from 150 nH to 700 nH. In the case of a wire wound type including a ferrite core, the inductance 6 is from 60 nH to 100 nH. In the case of a multilayer type, the inductance 6 is from 47 nH to 130 nH. In the case of a film type, the inductance 6 is from 110 nH to 150 nH. In the case of a thin film type, the inductance 6 is from 30 nH to 40 nH.

Each inductor 6 is mounted on a path that connects the external connection terminal 52 and the wireless communication control unit 1. In the present embodiment, the inductor 6 is mounted on each of the paths that respectively connect all the external connection terminals 52 and the wireless communication control unit 1. In other words, all the external connection terminals 52 are connected to the wireless communication control unit 1 via the respective inductors 6.

Also, in the present embodiment, another electronic element is not mounted between the inductors 6 and the respective external connection terminals 52. That is, each inductor 6 and the corresponding external connection terminal 52 are connected without another electronic element being interposed therebetween. The plurality of external connection terminals 52 are arranged adjacent to the connector portion 5 (the plurality of external connection terminals 52).

Next, the operation of the wireless module A1 will be described.

According to the present embodiment, each external connection terminal 52 is connected to the wireless communication control unit 1 via an inductor 6. Therefore, when a radio wave is transmitted in wireless communication by the wireless communication control unit 1, a current in a communication frequency band can be prevented from flowing outside the wireless module A1 by the inductors 6. Accordingly, the output of a radio wave used for wireless communication can be prevented from unreasonably decreasing, and the gain of the radio wave can be improved. Also, even in the case where a current in a frequency band that is the same as the communication frequency band of the radio wave used for wireless communication by the wireless communication control unit 1 flows via the external connection terminals 52, the current component in the frequency band that is the same as the communication frequency band is cut off by the inductors 6. Accordingly, the wireless communication by the wireless communication control unit 1 can be prevented from being hampered by an unintended noise current. As a result, stable wireless communication can be performed by the wireless module A1.

Specifically, in the present embodiment, all the external connection terminals 52 are connected to the wireless communication control unit 1 via the respective inductors 6. Accordingly, the gain of the wireless communication by the wireless communication control unit 1 is improved, and the wireless communication can be securely prevented from being hampered by an unintended noise current.

In the case where the wireless communication performed by the wireless communication control unit 1 conforms to Wi-SUN, and the communication frequency is approximately 920 Mhz, the quarter wavelength is approximately 81 mm. The maximum length of the wireless control communication unit substrate 2 and the support substrate 3 of the wireless module A1 is smaller than the quarter wavelength. Therefore, in the wireless communication control unit substrate 2 and the support substrate 3, there is little possibility that a radio wave in the communication frequency band is unintentionally transmitted or received. On the other hand, in a state in which the external connector 83 is connected to the connector portion 5, the external harness 84 constitutes a conduction path having a predetermined length in an electronic apparatus such as a meter reading device to which the wireless module A1 is mounted. Accordingly, the external harness 84 may unintentionally receive a radio wave in the communication frequency band. According to the present embodiment, even if the external harness 84 receives a radio wave in the communication frequency band, the current generated thereby is cut off by the inductors 6. Therefore, even in a state in which the wireless module A1 is mounted on various electronic apparatuses, the gain of the wireless communication by the wireless communication control unit 1 is improved, and the wireless communication can be prevented from being hampered by an unintended noise current.

Each inductor 6 is connected to the external connection terminal 52 without an electronic element being interposed therebetween. Furthermore, the inductors 6 are arranged adjacent to the connector portion 5. Accordingly, even if the external harness 84 receives a radio wave in the communication frequency band, not only the influence is prevented from reaching the wireless communication control unit 1, but also the function to be performed by the electronic elements 7 mounted on the support substrate 3 is prevented from being influenced thereby.

FIGS. 3 to 28 illustrate a modification and other embodiments of the present invention. Note that in these figures, the same reference signs as the above embodiment are given to elements that are the same as or similar to the above embodiment.

Figure 3:
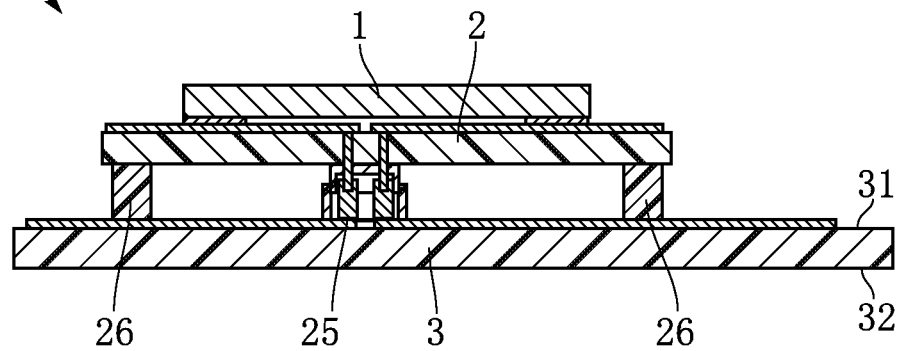
FIG. 3 is a cross-sectional view illustrating a modification of the wireless communications module in FIG. 1.

FIG. 3 illustrates a modification of the wireless module A1. In the present modification, the wireless communication control unit substrate 2 and the support substrate 3 are connected via a connector portion 25. The connector portion 25 includes a part that is fixed to the wireless communication control unit substrate 2 side and a part that is fixed to the support substrate 3 side. Each of the parts includes a case made of resin, for example, and terminals housed in the case.

Also, in the present modification, a plurality of posts 26 are provided for stably fixing the wireless communication control unit substrate 2 to the support substrate 3. The plurality of posts 26 are arranged in the vicinity of end portions of the wireless communication control unit substrate 2, for example. A configuration that includes a columnar resin portion and screw portions that fix the resin portion to the wireless communication control unit substrate 2 and the support substrate 3, respectively, is a specific configuration of the post 26.

According to such a modification as well, stable wireless communication can be performed by the wireless module A1. Also, various modes including the examples shown in FIGS. 2 and 3 can be adopted as a connection mode of the wireless communication control unit substrate 2 and the support substrate 3. This similarly applies to the embodiments that will be discussed below.

Figure 4:
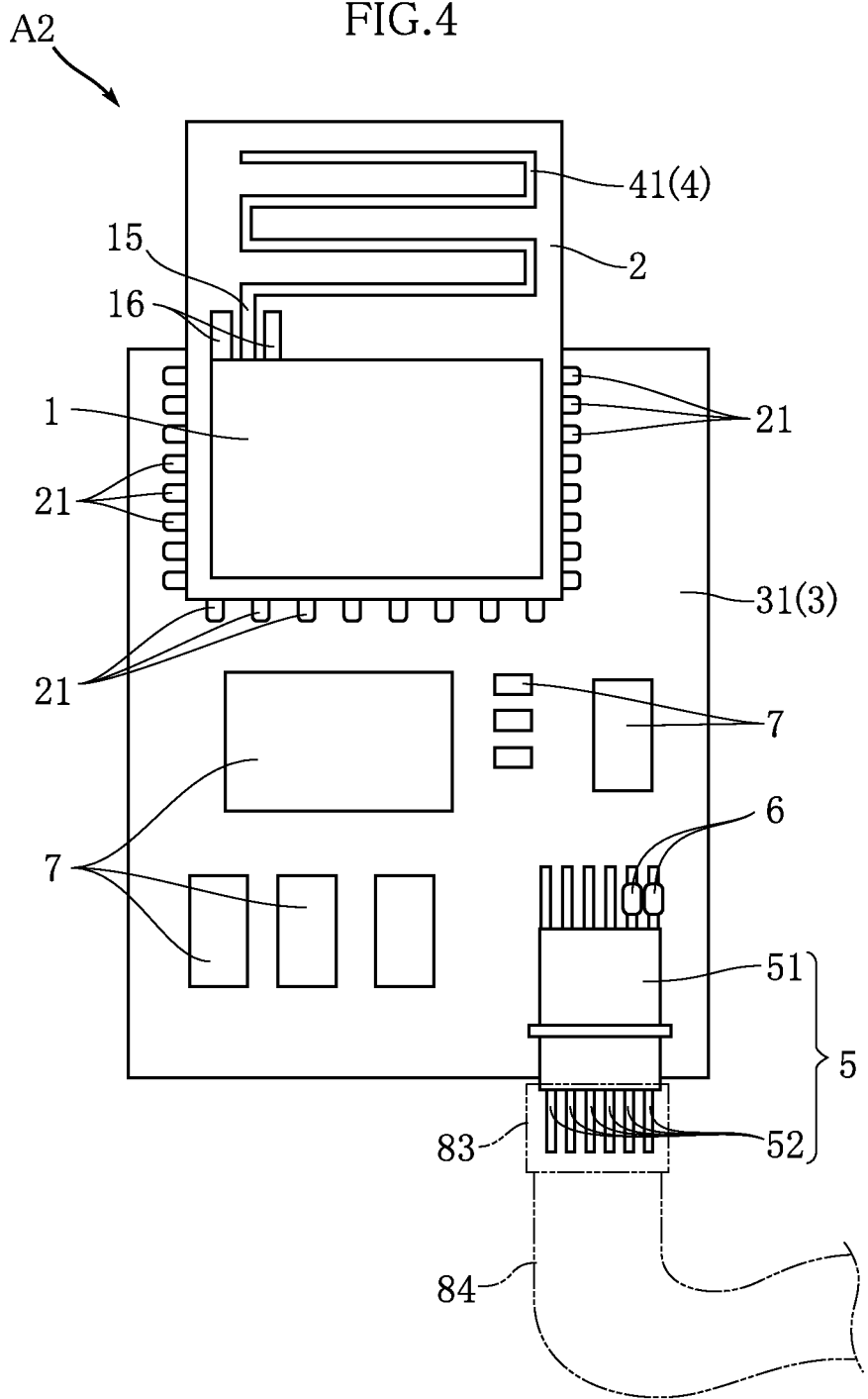
FIG. 4 is a plan view illustrating a wireless communications module based on a second embodiment of the present invention.

FIG. 4 illustrates a wireless communications module based on a second embodiment of the present invention. In a wireless module A2 of the present embodiment, some of the plurality of external connection terminals 52 of the connector portion 5 and the wireless communication control unit 1 are connected via a corresponding number of the inductors 6. That is, some external connection terminals 52 are each connected to the wireless communication control unit 1 without the inductor 6 being interposed therebetween.

In order to achieve the above-described effects, the inductors 6 are preferably mounted to external connection terminals 52, among the plurality of external connection terminals 52, through which an unintended current in the communication frequency band is anticipated to flow. The external connection terminal 52 for power supply and the external connection terminal 52 for ground connection are the external connection terminals 52 through which such a current in the communication frequency band flows.

According to such an embodiment as well, stable wireless communication can be performed by the wireless module A2. Also, when the external harness 84 receives a radio wave in the communication frequency band, such reception may possibly occur in a conduction path for power supply and a conduction path for ground connection. According to the present embodiment, the external connection terminals 52 connected to such conduction paths are each connected to the wireless communication control unit 1 via the inductor 6. Therefore, the wireless communication performed by the wireless communication control unit 1 can be performed appropriately.

Figure 5:
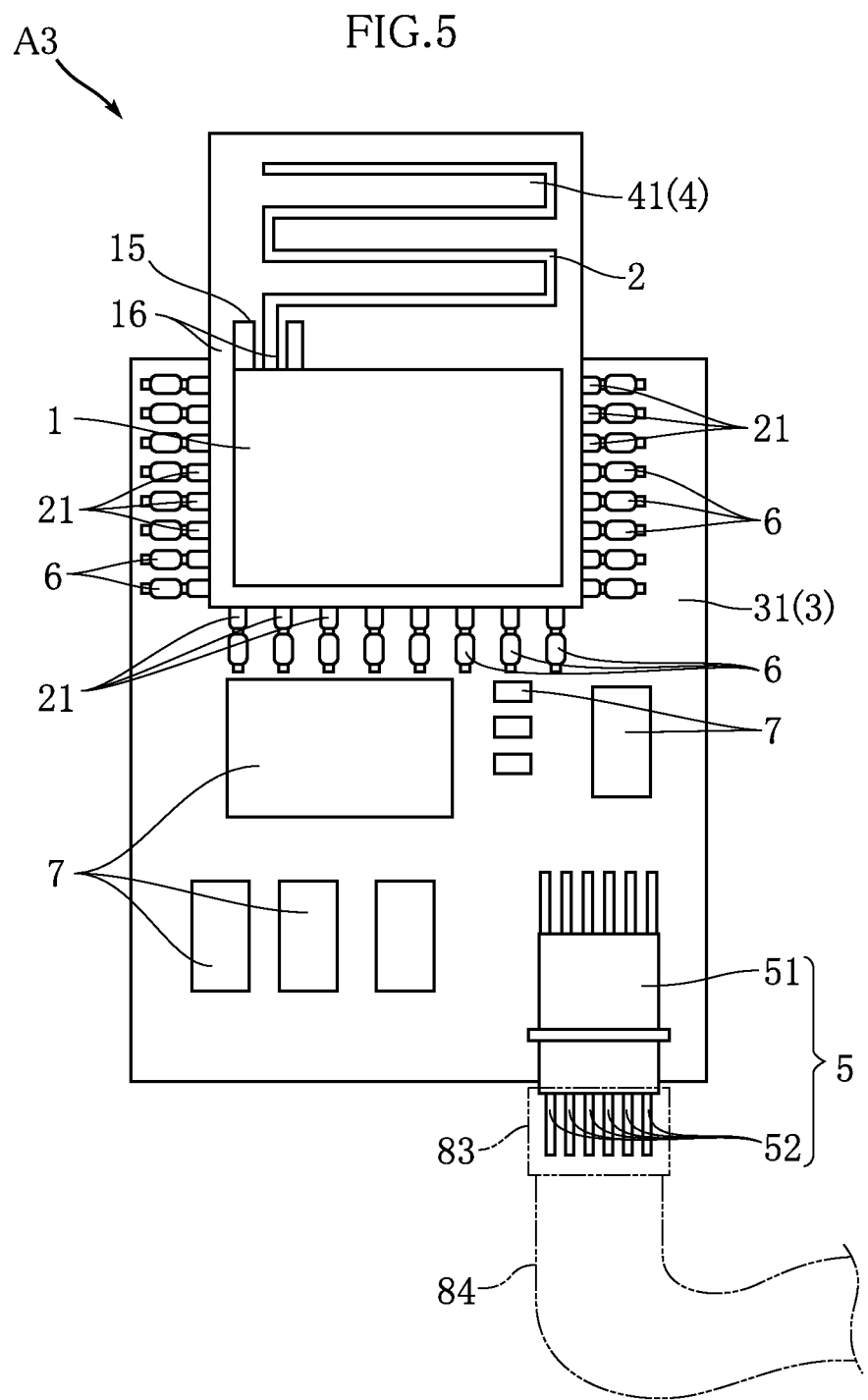
FIG. 5 is a plan view illustrating a wireless communications module based on a third embodiment of the present invention.

FIG. 5 illustrates a wireless communications module based on a third embodiment of the present invention. A wireless module A3 of the present embodiment differs from the above-described embodiments in that the positions at which the plurality of inductors 6 are mounted are different. In the present embodiment, the plurality of inductors 6 are arranged adjacent to the wireless communication control unit substrate 2. Also, each inductor 6 is connected to the corresponding mounting terminal 21 of the wireless communication control unit substrate 2 without an electronic element being interposed therebetween. Furthermore, in the present embodiment, all the external connection terminals 52 are connected to the respective mounting terminals 21 via the respective inductors 6.

According to such an embodiment as well, stable wireless communication can be performed by the wireless module A3.

Figure 6:
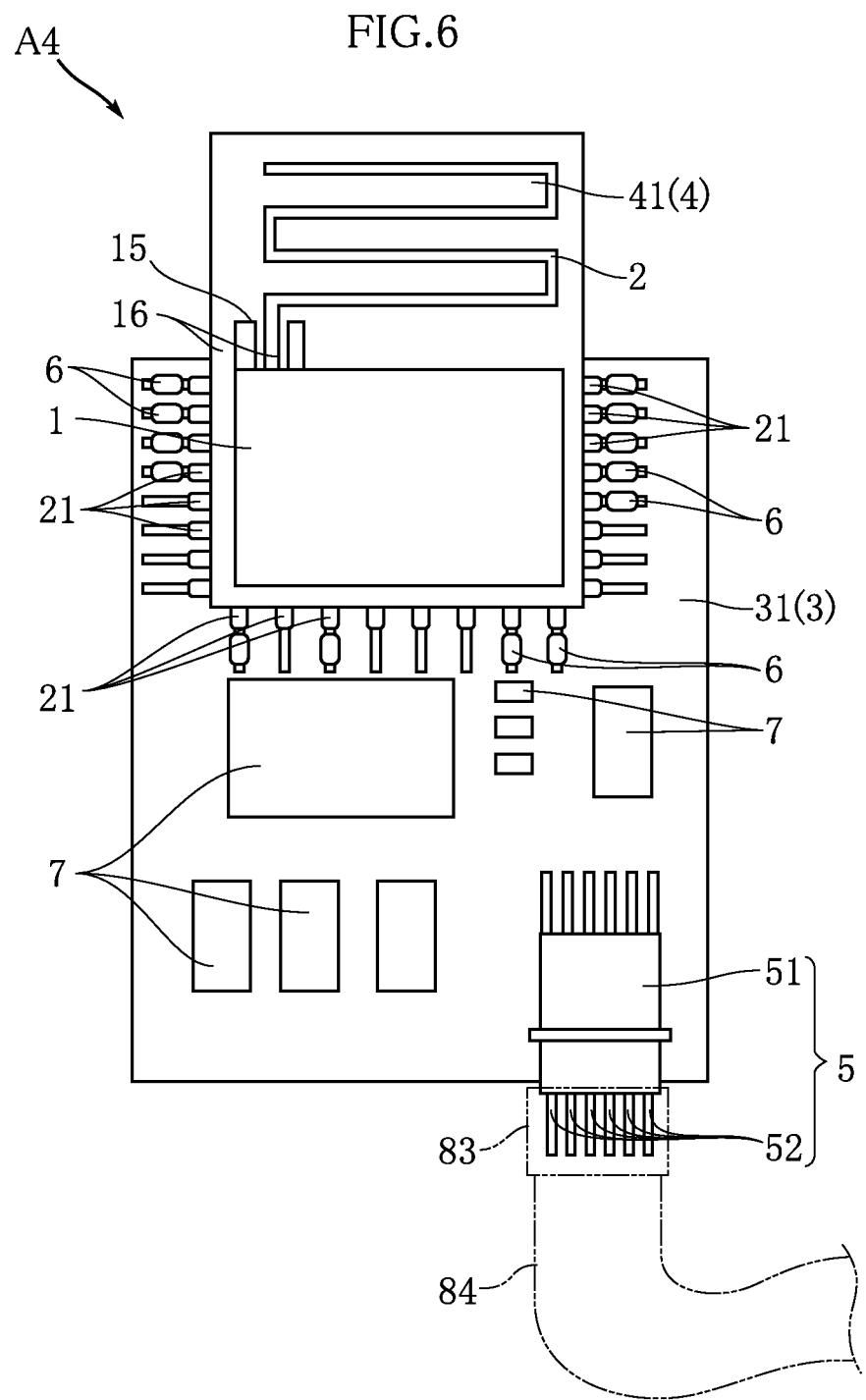
FIG. 6 is a plan view illustrating a wireless communications module based on a fourth embodiment of the present invention.

FIG. 6 illustrates a wireless communications module based on a fourth embodiment of the present invention. In a wireless module A4 of the present embodiment, some of the plurality of mounting terminals 21 of the wireless communication control unit substrate 2 and the plurality of external connection terminals 52 are connected via a corresponding number of inductors 6. That is, some external connection terminals 52 are individually connected to the wireless communication control unit 1 without an inductor 6 being interposed therebetween.

In order to achieve the above-described effects, the inductors 6 are preferably mounted to mounting terminals 21, among the plurality of mounting terminals 21, through which an unintended current in the communication frequency band is anticipated to flow. The mounting terminal 21 for power supply and the mounting terminal 21 for ground connection are the mounting terminals 21 through which such a current in the communication frequency band flows.

According to such an embodiment as well, stable wireless communication can be performed by the wireless module A4.

Figure 7:
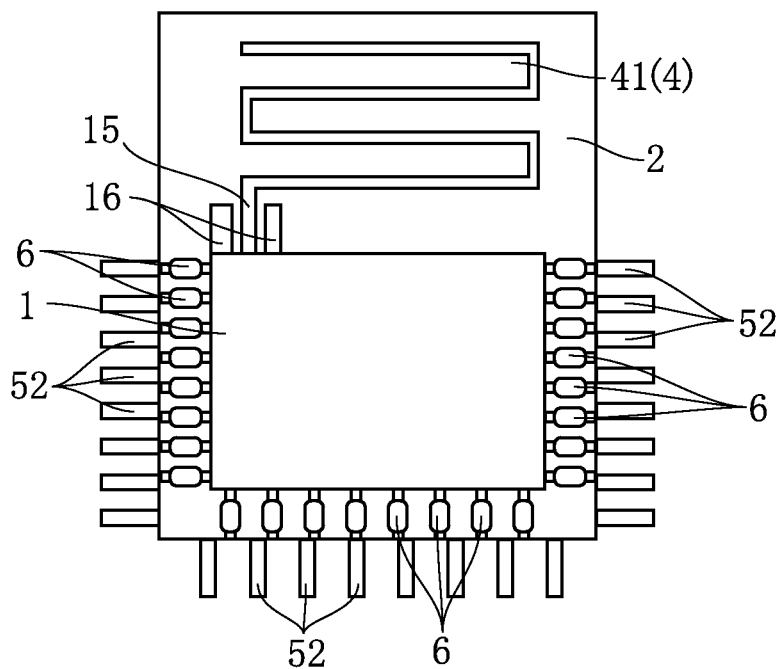
FIG. 7 is a plan view illustrating a wireless communications module based on a fifth embodiment of the present invention.

FIG. 7 illustrates a wireless communications module based on a fifth embodiment of the present invention. A wireless module A5 of the present embodiment differs from the above-described embodiments in that the support substrate 3 is not included. In the present embodiment as well, the wireless communication control unit 1 is mounted on the wireless communication control unit substrate 2. Also, the conductor pattern 41 of the antenna portion 4 is formed in the wireless communication control unit substrate 2.

A plurality of external connection terminals 52 are provided on the wireless communication control unit substrate 2. The plurality of external connection terminals 52 in the present embodiment may be configured similarly to the plurality of mounting terminals 21 in the above-described embodiments. Also, all of the plurality of external connection terminals 52 are connected to the wireless communication control unit 1 via the respective inductors 6.

In the present embodiment, the plurality of inductors 6 are mounted on the wireless communication control unit substrate 2. Specifically, the plurality of inductors 6 are arranged along three sides of the wireless control unit substrate 2. The plurality of external connection terminals 52 protrude from these three sides.

According to such an embodiment as well, stable wireless communication can be performed by the wireless module A5. Also, the size of the wireless module A5 can be reduced as a result of being configured such that the support substrate 3 is not included.

Figure 8:
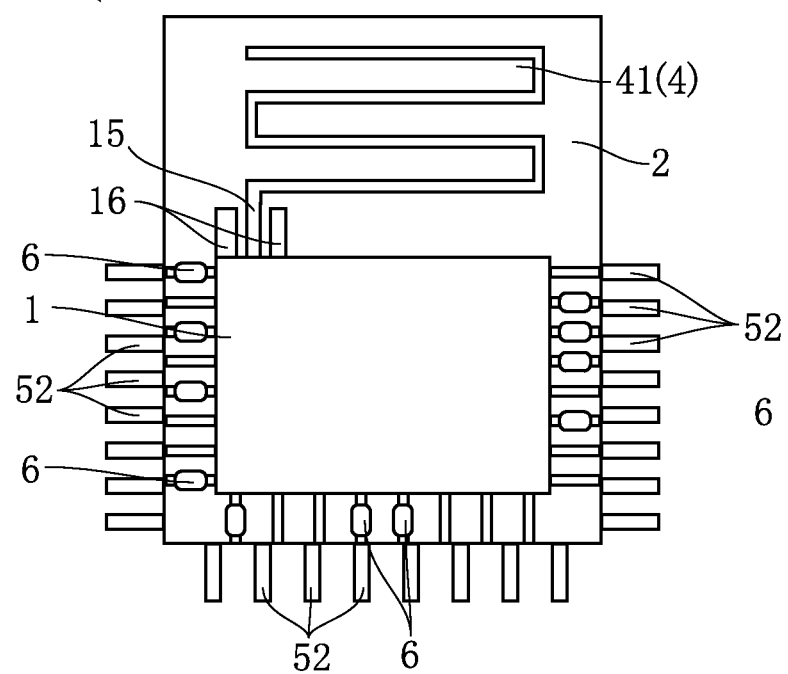
FIG. 8 is a plan view illustrating a wireless communications module based on a sixth embodiment of the present invention.

FIG. 8 illustrates a wireless communications module based on a sixth embodiment of the present invention. A wireless module A6 of the present embodiment is in common with the above-described wireless module A5 in that the support substrate 3 is not included. Also, in the present embodiment as well, the plurality of inductors 6 are mounted on the wireless control unit substrate 2. However, in the wireless module A6 of the present embodiment, some of the plurality of external connection terminals 52 and the wireless communication control unit 1 are connected via a corresponding number of inductors 6. That is, some external connection terminals 52 are individually connected to the wireless communication control unit 1 without an inductor 6 being interposed therebetween.

In order to achieve the above-described effects, the inductors 6 are preferably mounted to external connection terminals 52, among the plurality of external connection terminals 52, through which an unintended current in the communication frequency band is anticipated to flow. The external connection terminal 52 for power supply and the external connection terminal 52 for ground connection are the external connection terminals 52 through which such a current in the communication frequency band flows.

According to such an embodiment as well, stable wireless communication can be performed by the wireless module A6.

Figure 9:
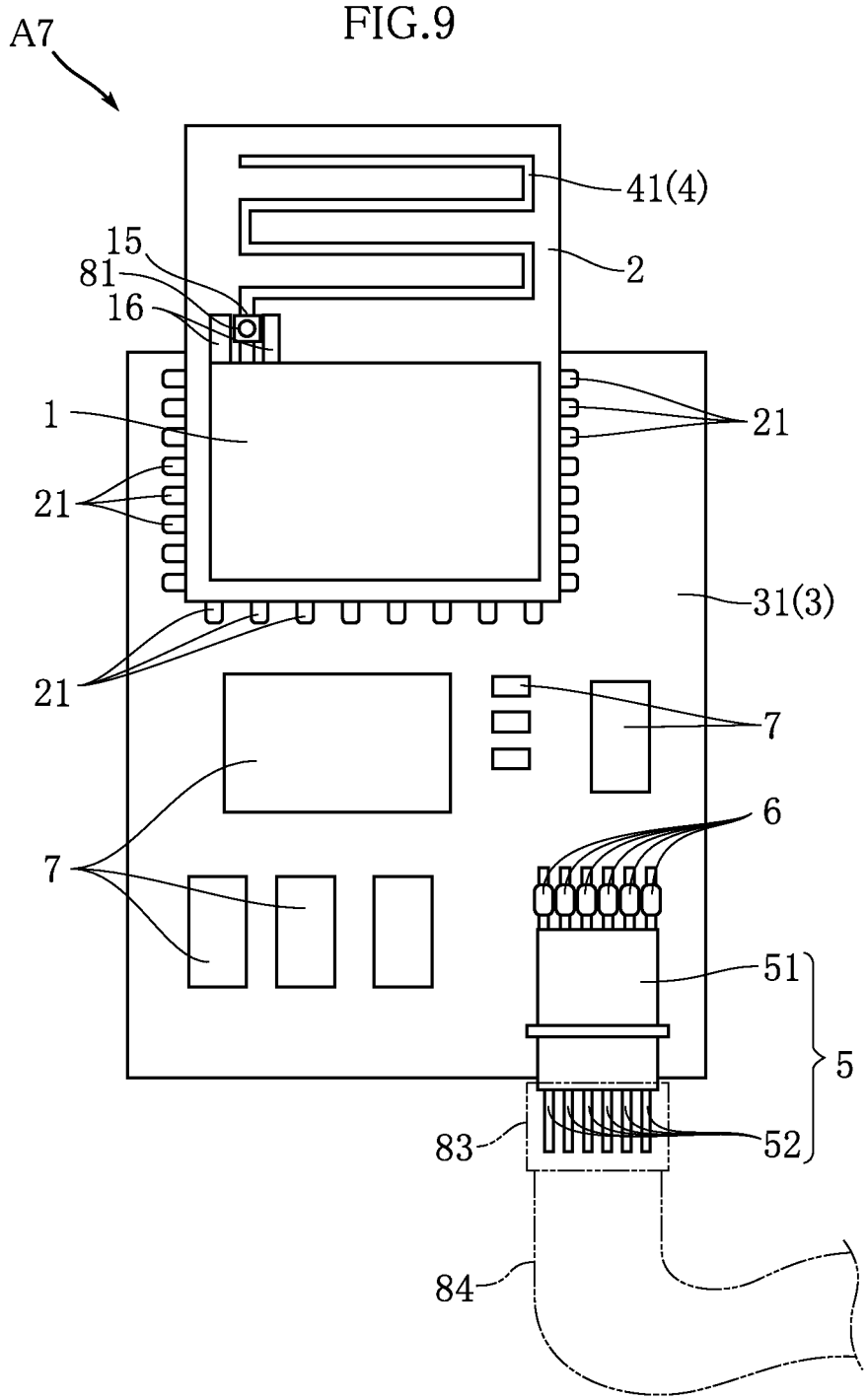
FIG. 9 is a plan view illustrating a wireless communications module based on a seventh embodiment of the present invention.
Figure 10:
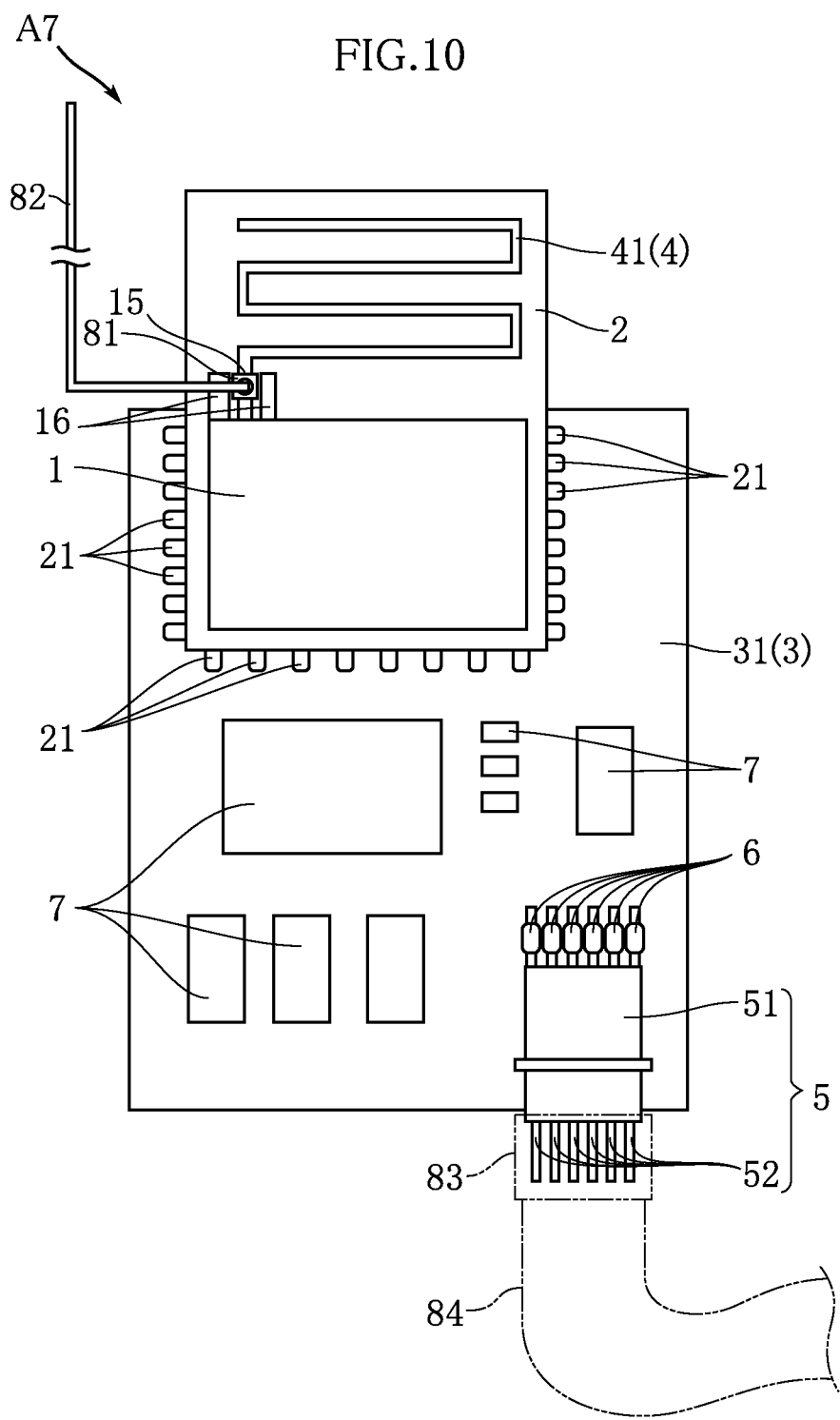
FIG. 10 is a plan view illustrating one mode of use state of the wireless communications module in FIG. 9.

FIGS. 9 and 10 illustrate a wireless communications module based on a seventh embodiment of the present invention. A wireless module A7 of the present embodiment is configured similarly to the above-described wireless module A1 except that an external antenna connection portion 81 is included. That is, all of the plurality of external connection terminals 52 are connected to the wireless communication control unit 1 via the respective inductors 6. Note that, as for the configuration of the plurality of inductors 6, a configuration may be adopted in which only some of the plurality of external connection terminals 52 are connected to the wireless communication control unit 1 via the respective inductors 6, similarly to the above-described wireless module A2.

The external antenna connection portion 81 is for connecting an external antenna 82 shown in FIG. 10. The external antenna connection portion 81 is arranged in the vicinity of the feeding point 15. In the state shown in FIG. 9, the external antenna 82 is not connected to the external antenna connection portion 81. On the other hand, in a state shown in FIG. 10, the external antenna 82 is connected to the external antenna connection portion 81.

Figure 11:
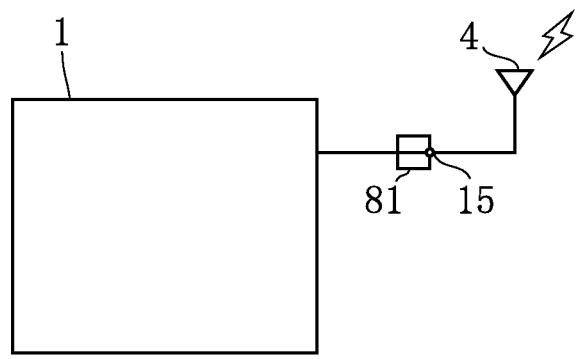
FIG. 11 is a schematic system configuration diagram illustrating the wireless communications module in a state shown in FIG. 9.

The function of the external antenna connection portion 81 will be described with reference to FIGS. 11 and 12. The external antenna connection portion 81 is electrically connected to the feeding point 15. In a state in which the external antenna 82 is not connected, the external antenna connection portion 81 connects the wireless communication control unit 1 to the conductor pattern 41 of the antenna portion 4 via the feeding point 15, as shown in FIG. 11. Accordingly, the conductor pattern 41 of the antenna portion 4 transmits and receives a radio wave in wireless communication by the wireless communication control unit 1.

Figure 12:
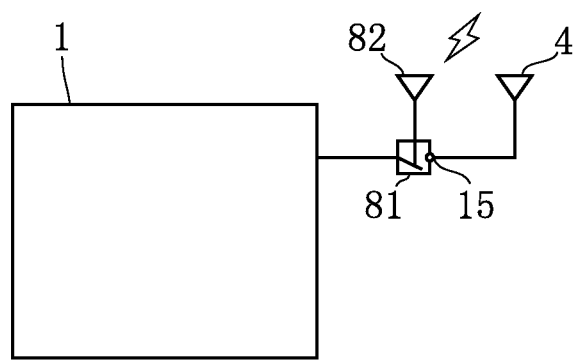
FIG. 12 is a schematic system configuration diagram illustrating the wireless communications module in a state shown in FIG. 10.

On the other hand, in the case where the external antenna 82 is connected to the external antenna connection portion 81, as shown in FIG. 12, the external antenna connection portion 81 cuts off the connection between the wireless communication control unit 1 and the conductor pattern 41 of the antenna portion 4, and insulates between them. Also, the external antenna connection portion 81 connects the wireless communication control unit 1 to the external antenna 82. In this state, the external antenna 82 transmits and receives a radio wave in wireless communication by the wireless communication control unit 1. In this way, the external antenna connection portion 81 functions as a switch that changes the conduction path depending on whether or not the external antenna 82 is connected.

According to such an embodiment as well, stable wireless communication can be performed by the wireless module A7. As a result of adopting a configuration in which the external antenna 82 can be connected, the external antenna 82 appropriate to an electronic apparatus on which the wireless module A7 is to be mounted can be selected as required. As a result of selecting the external antenna 82 according to the electronic apparatus, the external antenna 82 can be set to a position and a shape such that a radio wave can be effectively transmitted and received in the electronic apparatus.

Figure 13:
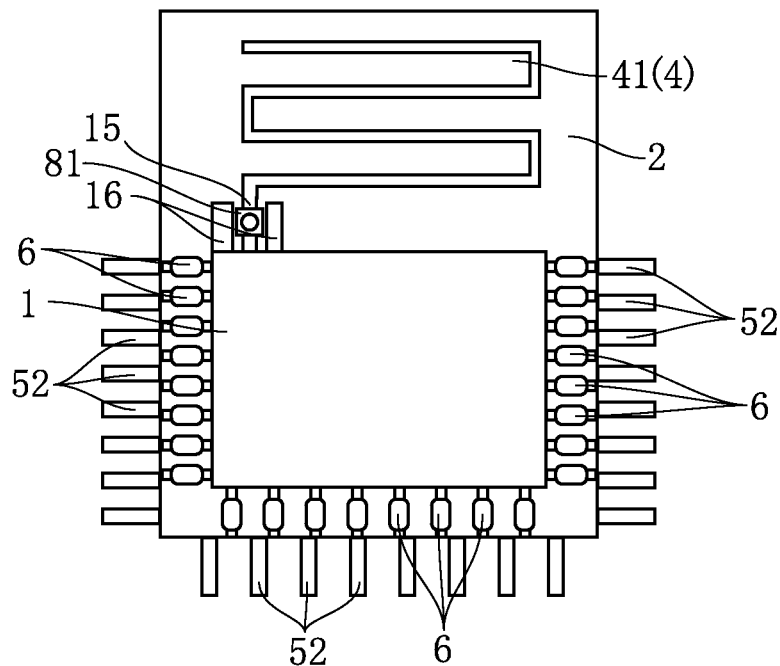
FIG. 13 is a plan view illustrating a wireless communications module based on an eighth embodiment of the present invention.
Figure 14:
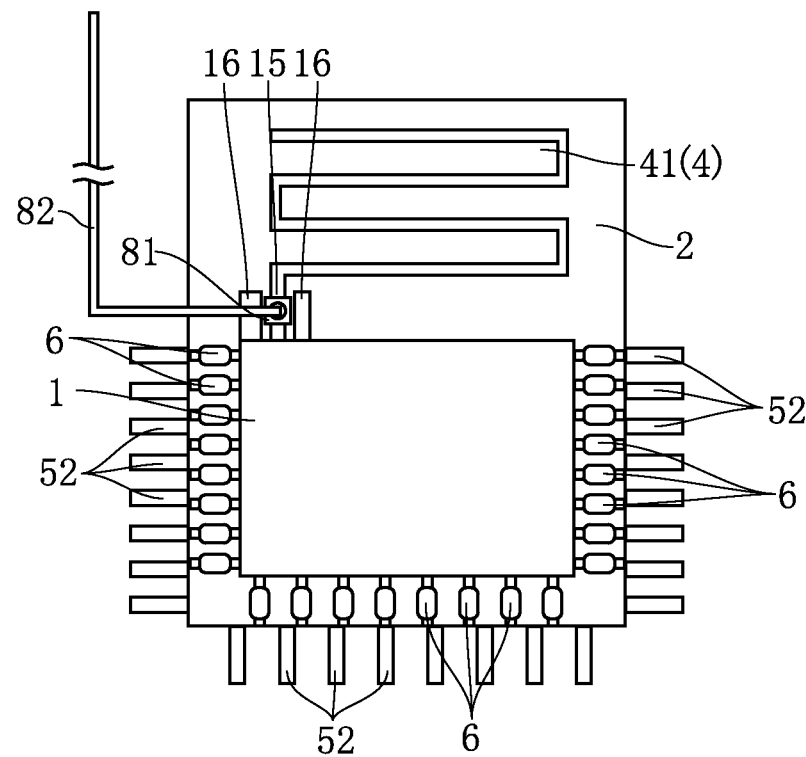
FIG. 14 is a plan view illustrating one mode of use state of the wireless communications module in FIG. 13.

FIGS. 13 and 14 illustrate a wireless communications module based on an eighth embodiment of the present invention. A wireless module A8 of the present embodiment is configured similarly to the above-described wireless module A5 except that the above-described external antenna connection portion 8l is included. That is, all of the plurality of external connection terminals 52 are connected to the wireless communication control unit 1 via the respective inductors 6. Note that, as for the configuration of the plurality of inductors 6, a configuration may be adopted in which some of the plurality of external connection terminals 52 are connected to the wireless communication control unit 1 via the respective inductors 6, similarly to the above-described wireless module A6.

In a state shown in FIG. 13, the conductor pattern 41 of the antenna portion 4 transmits and receives a radio wave in wireless communication by the wireless communication control unit 1. On the other hand, in a state shown in FIG. 14, the external antenna 82 is connected to the external antenna connection portion 81. Accordingly, the external antenna 82 transmits and receives a radio wave in wireless communication by the wireless communication control unit 1.

According to such an embodiment as well, stable wireless communication can be performed by the wireless module A8.

Figure 15:
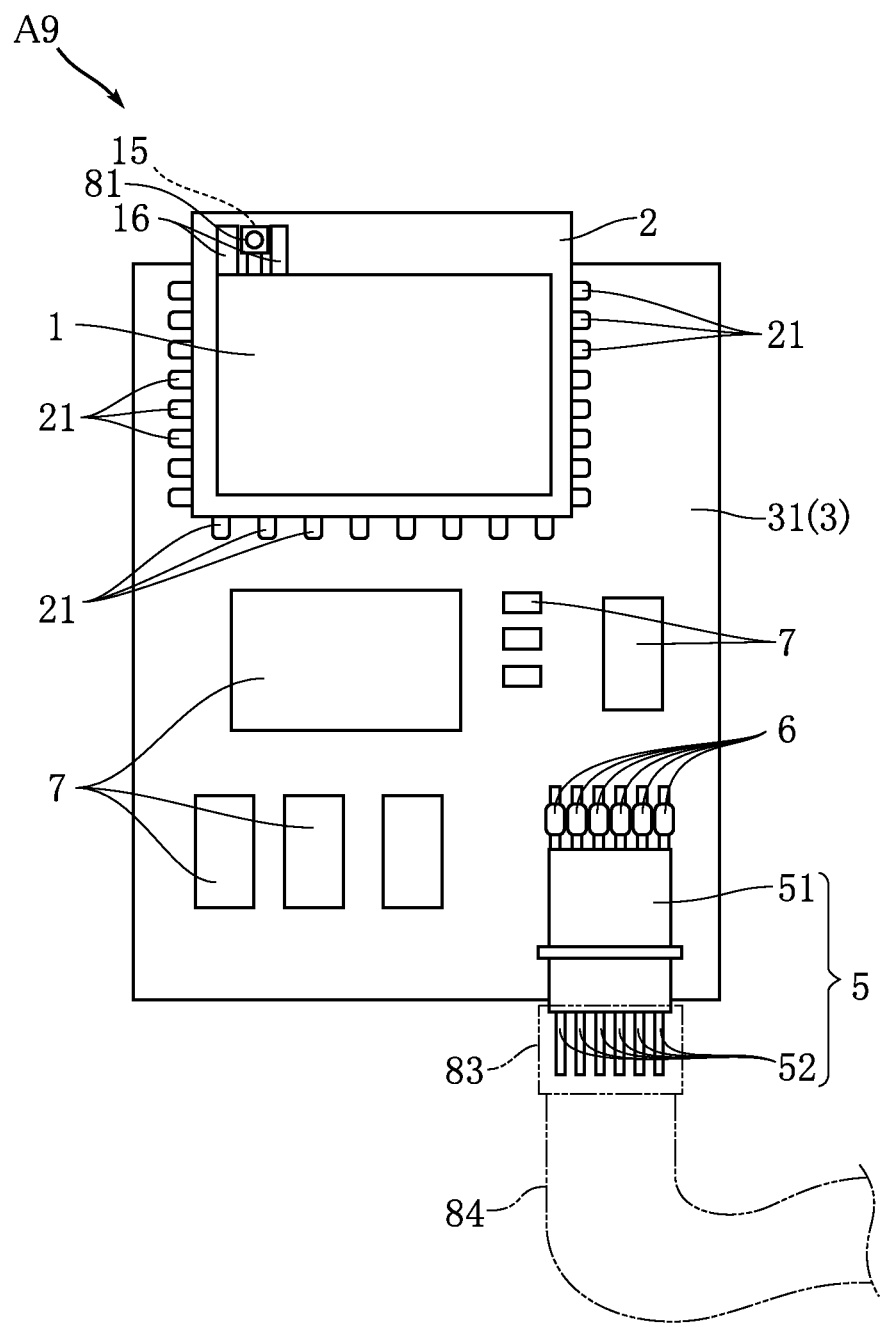
FIG. 15 is a plan view illustrating a wireless communications module based on a ninth embodiment of the present invention.
Figure 16:
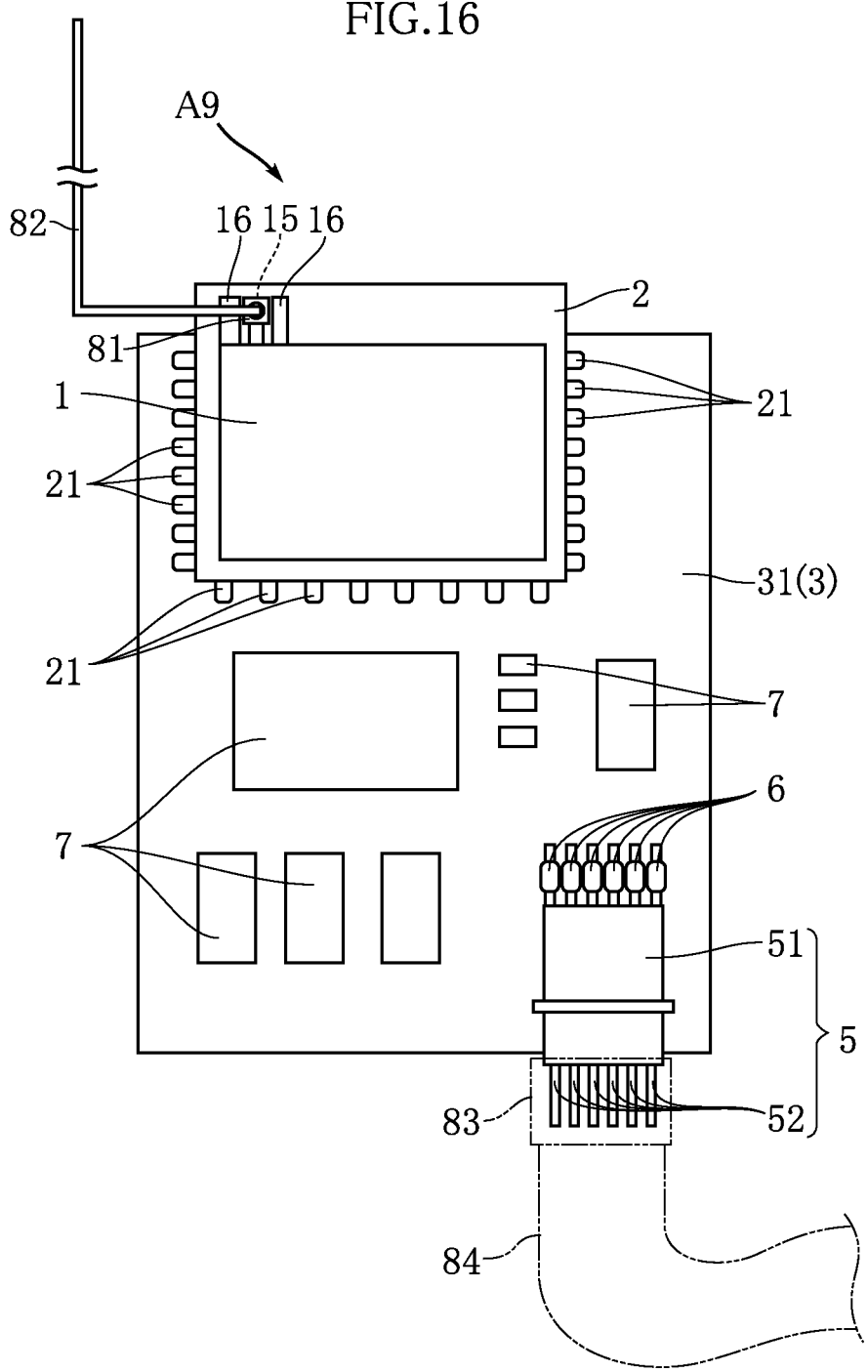
FIG. 16 is a plan view illustrating one mode of use state of the wireless communications module in FIG. 15.

FIGS. 15 and 16 illustrate a wireless communications module based on a ninth embodiment of the present invention. A wireless module A9 of the present embodiment is configured similarly to the above-described wireless module A7 except that the conductor pattern 41 of the antenna portion 4 is not formed in the wireless control unit substrate 2. That is, in the state in which the external antenna 82 is not connected to the external antenna connection portion 81 shown in FIG. 15, although the wireless communication control unit 1 that controls wireless communication is included, a configuration for transmitting and receiving a radio wave for wireless communication is not included. It is not intended that such a configuration is used by being mounted as is on an electronic apparatus such as a meter reading device. The state is envisioned as a state in an intermediate step until the wireless module A9 is transported to a location where the wireless module A9 is mounted to an electronic apparatus such as a meter reading device, for example.

In the state shown in FIG. 16, the external antenna 82 is connected to the external antenna connection portion 81. Accordingly, wireless communication by the wireless communication control unit 1 is made possible as a result of transmitting and receiving a radio wave by the external antenna 82.

According to such an embodiment as well, stable wireless communication can be performed by the wireless module A9. Also, as a result of not including the conductor pattern 41 of the antenna portion 4, the size of the wireless control unit substrate 2, and furthermore the size of the wireless module A9 can be reduced.

Figure 17:
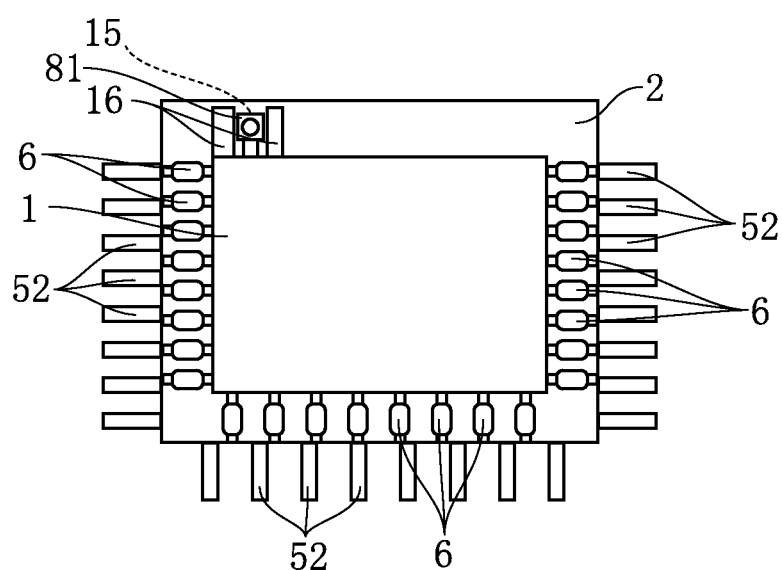
FIG. 17 is a plan view illustrating a wireless communications module based on a tenth embodiment of the present invention.
Figure 18:
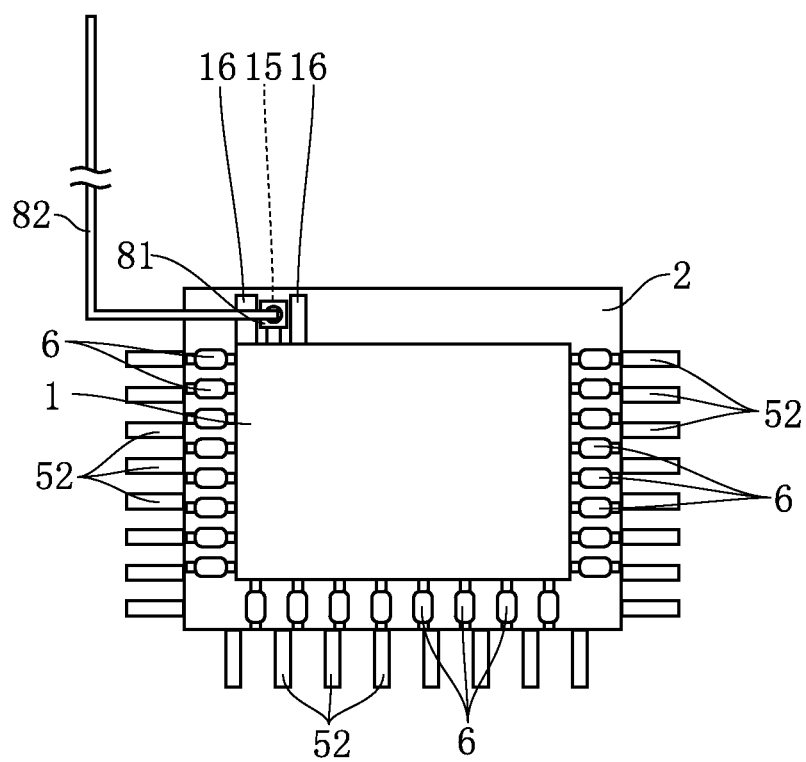
FIG. 18 is a plan view illustrating one mode of use state of the wireless communications module in FIG. 17.

FIGS. 17 and 18 illustrate a wireless communications module based on a tenth embodiment of the present invention. A wireless module A10 of the present embodiment is configured similarly to the above-described wireless module A8 except that the conductor pattern 41 of the antenna portion 4 is not formed in the wireless control unit substrate 2. That is, in a state in which the external antenna 82 is not connected to the external antenna connection portion 81 shown in FIG. 17, although the wireless communication control unit 1 that controls wireless communication is included, a configuration for transmitting and receiving a radio wave for wireless communication is not included. It is not intended that such a configuration is used by being mounted as is on an electronic apparatus such as a meter reading device. The state is envisioned as a state in an intermediate step until the wireless module A10 is transported to a location where the wireless module A10 is mounted to an electronic apparatus such as a meter reading device.

In the state shown in FIG. 18, the external antenna 82 is connected to the external antenna connection portion 81. Accordingly, wireless communication by the wireless communication control unit 1 is made possible as a result of transmitting and receiving a radio wave by the external antenna 82.

According to such an embodiment as well, stable wireless communication can be performed by the wireless module A10.

Figure 19:
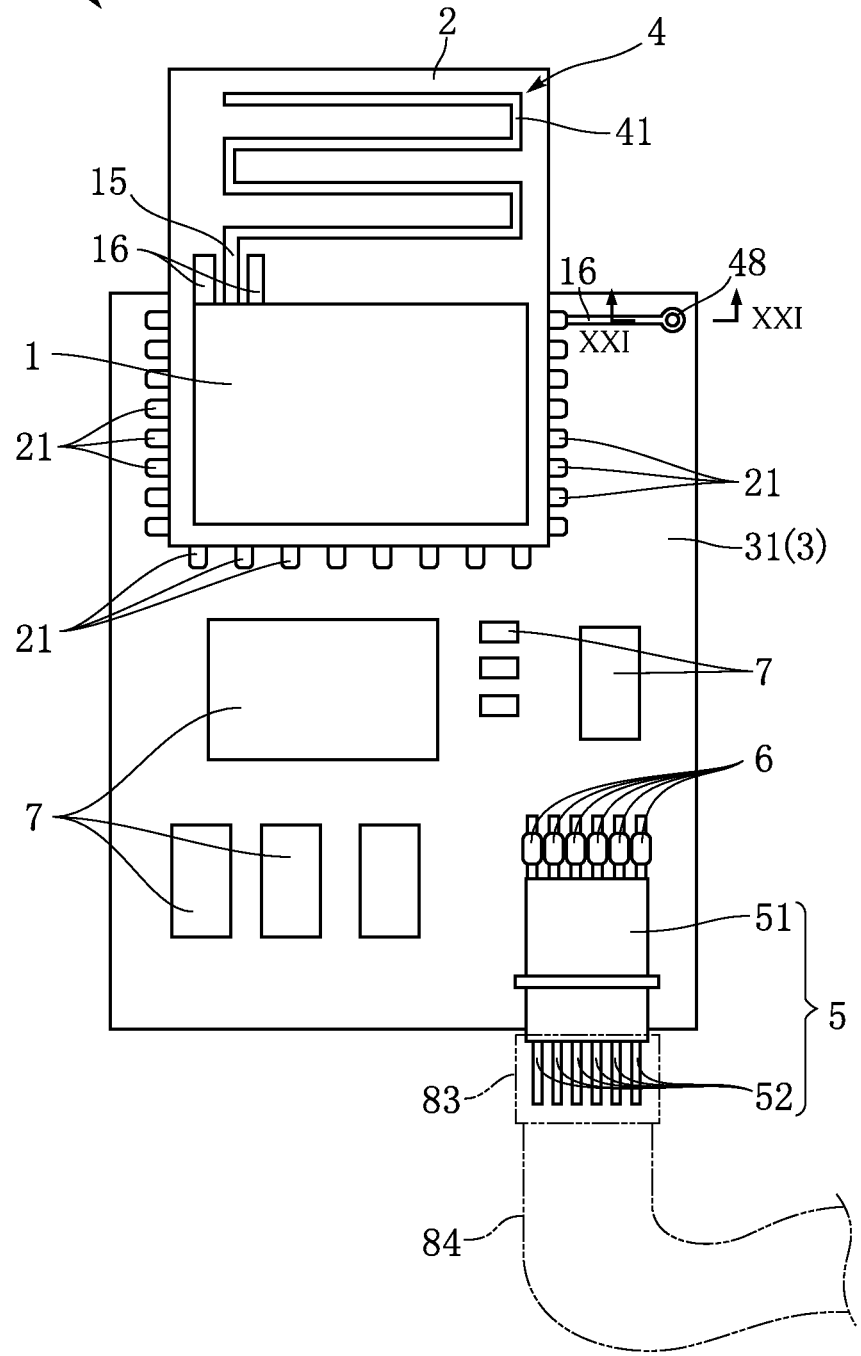
FIG. 19 is a plan view illustrating a wireless communications module based on an eleventh embodiment of the present invention.
Figure 20:
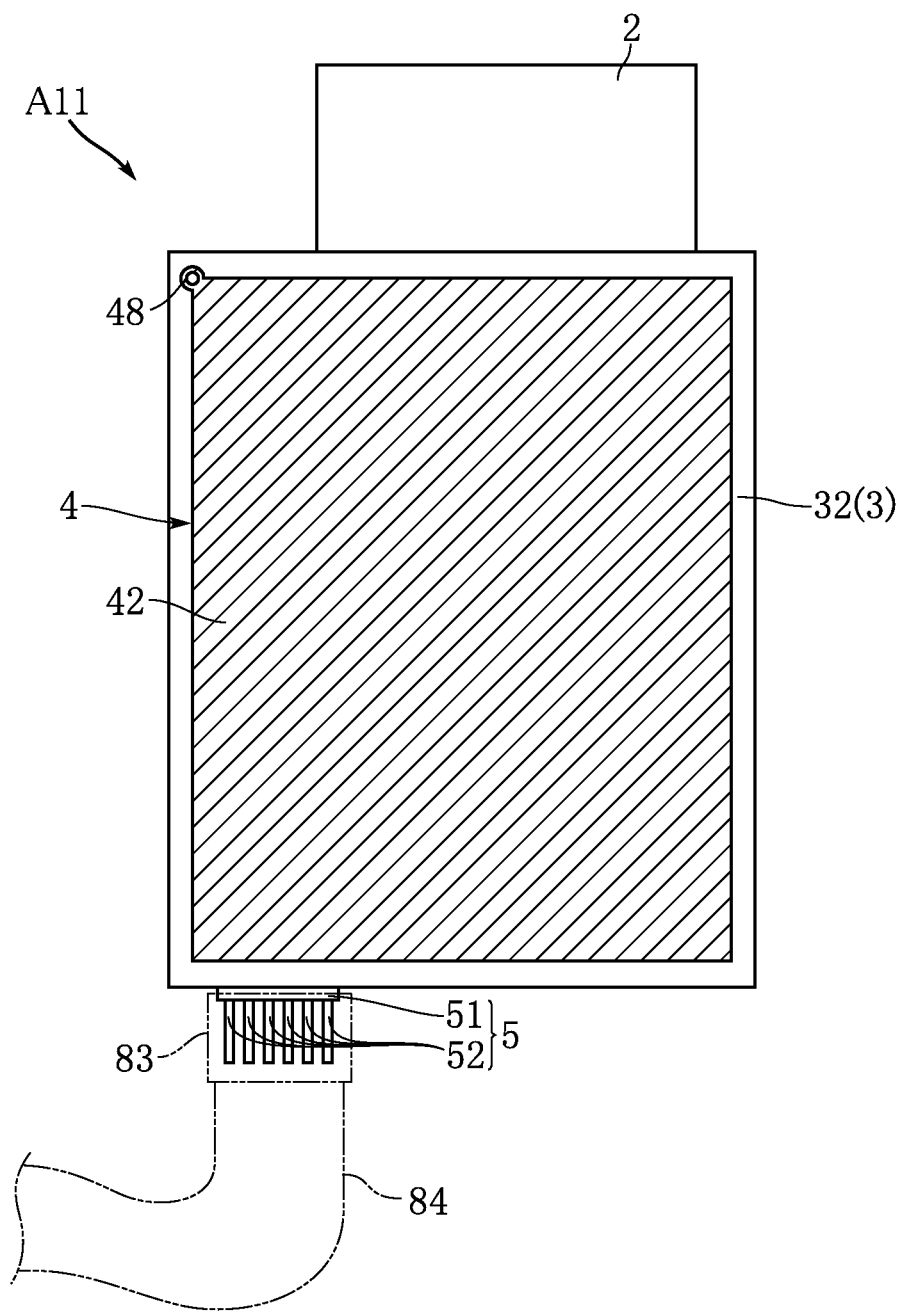
FIG. 20 is a bottom view illustrating the wireless communications module in FIG. 19.
Figure 21:
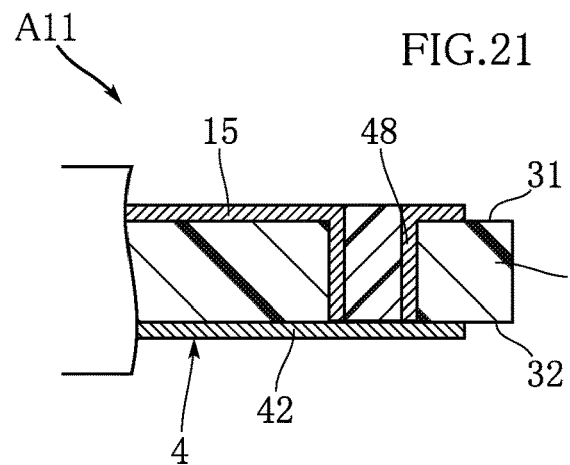
FIG. 21 is an enlarged cross-sectional view of a main part taken along line XXI-XXI in FIG. 19.

FIGS. 19 to 21 illustrate a wireless communications module based on an eleventh embodiment of the present invention. A wireless module A11 of the present embodiment differs from the above-described embodiments in the configuration of the antenna portion 4. Meanwhile, the plurality of inductors 6 may be configured similarly to the wireless module A1, as shown in FIG. 19, or alternatively, may be configured similarly to the wireless module A2. Note that FIG. 19 is a plan view illustrating the wireless module A11, and FIG. 20 is a bottom view illustrating the wireless module A11. Also, FIG. 21 is an enlarged cross-sectional view of a main part taken along line XXI-XXI in FIG. 19.

In the wireless module A11 of the present embodiment, the antenna portion 4 is configured so as to include the conductor pattern 41, a conductor pattern 42, and a through-hole conductor portion 48.

The conductor pattern 41 is configured similarly to that of the above-described wireless module A1, and is a portion that transmits and receives a radio wave in wireless communication by the wireless communication control unit 1. Note that a configuration may be adopted in which the above-described external antenna connection portion 81 is included in addition to the conductor pattern 41, or in place of the conductor pattern 41. The conductor pattern 42 is formed on a reverse surface 32 of the support substrate 3, and is made of a metal that is highly conductive such as Cu, for example, similarly to the above-described wiring pattern. In the present embodiment, only the conductor pattern 42 is formed on the reverse surface 32 of the support substrate 3, as shown in FIG. 20. Also, the conductor pattern 42 has a shape similar to the support substrate 3 in plan view, and occupies most of the reverse surface 32. In other words, only a rectangular annular portion having a small width that surrounds the conductor pattern 42 remains on the reverse surface 32 other than the conductor pattern 42.

The through-hole conductor portion 48 passes through the support substrate 3 in a thickness direction, as shown in FIG. 21, and reaches the obverse surface 31 and the reverse surface 32. The through-hole conductor portion 48 electrically connects the ground pattern 16 formed on the obverse surface 31 and the conductor pattern 42 formed on the reverse surface 32.

The through-hole conductor portion 48 is arranged adjacent to the ground pattern 16, as shown in FIG. 19. Also, the through-hole conductor portion 48 is formed in the vicinity of a corner portion of the wireless control unit substrate 2.

As shown in FIG. 20, the conductor pattern 42 is only connected to the through-hole conductor portion 48, and is not connected to any other portions. That is, the conductor pattern 42 is electrically connected to the ground pattern 16 via only one portion, which is the through-hole conductor portion 48. The through-hole conductor portion 48 is connected to a corner portion of the conductor pattern 42.

According to such an embodiment as well, stable wireless communication can be performed by the wireless module A11. Also, as a result of providing the conductor pattern 42 that occupies almost the entire region of the reverse surface 32 of the support substrate 3 and is connected to ground, the sensitivity of the antenna portion 4 can be increased.

Figure 22:
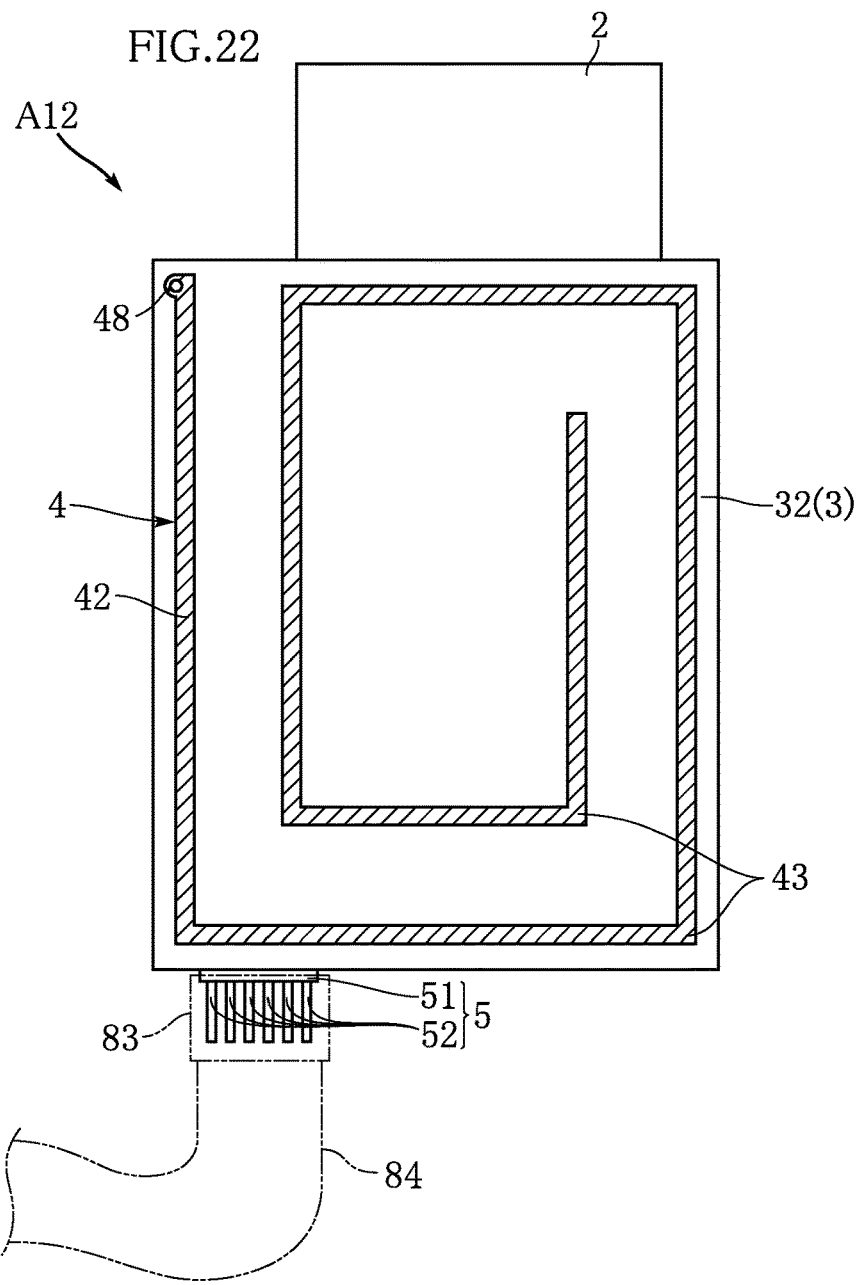
FIG. 22 is a bottom view illustrating a wireless communications module based on a twelfth embodiment of the present invention.

FIG. 22 illustrates a wireless communications module based on a twelfth embodiment of the present invention. A wireless module A12 of the present embodiment differs from the above-described wireless module A11 in the configuration of the conductor pattern 42. In the present embodiment, the conductor pattern 42 has a band shape. Also, the conductor pattern 42 includes a plurality of bent portions 43. The conductor pattern 42, as a whole, is formed in a spiral shape that inwardly extends from the through-hole conductor portion 48 formed in a corner portion of the support substrate 3. In the present embodiment as well, the conductor pattern 42 is electrically connected to the ground pattern 16 via only the through-hole conductor portion 48.

According to such an embodiment as well, stable wireless communication can be performed by the wireless module A12.

Figure 23:
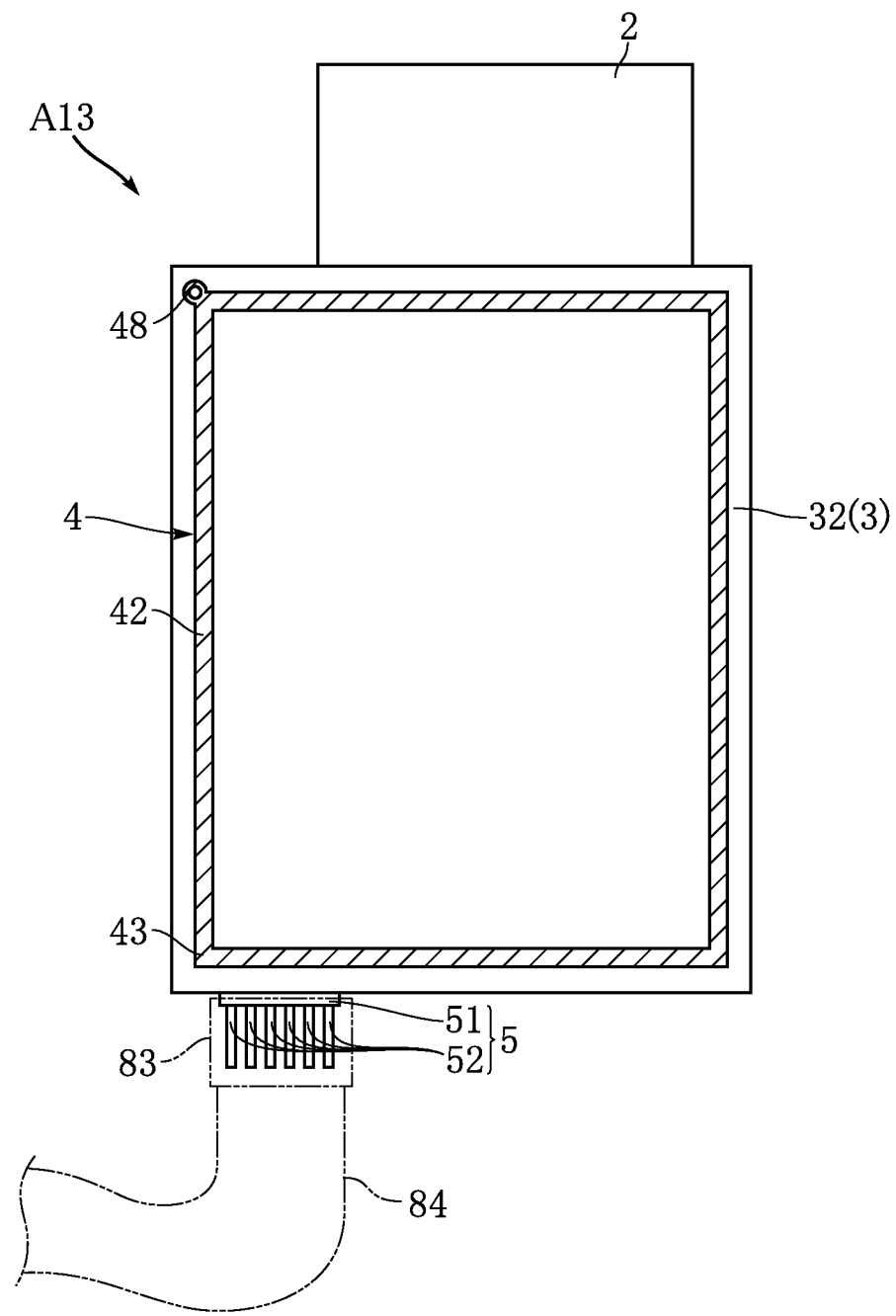
FIG. 23 is a bottom view illustrating a wireless communications module based on a thirteenth embodiment of the present invention.

FIG. 23 illustrates a wireless communications module based on a thirteenth embodiment of the present invention. A wireless module A13 of the present embodiment differs from the above-described wireless modules A11 and A12 in the configuration of the conductor pattern 42. In the present embodiment, the conductor pattern 42 has an annular shape. The conductor pattern 42 includes a plurality of bent portions 43. Accordingly, the conductor pattern 42 is formed in a rectangular annular shape that extends along an outline of the support substrate 3. In the present embodiment as well, the conductor pattern 42 is electrically connected to the ground pattern 16 via only the through-hole conductor portion 48.

According to such an embodiment as well, stable wireless communication can be performed by the wireless module A13.

Figure 24:
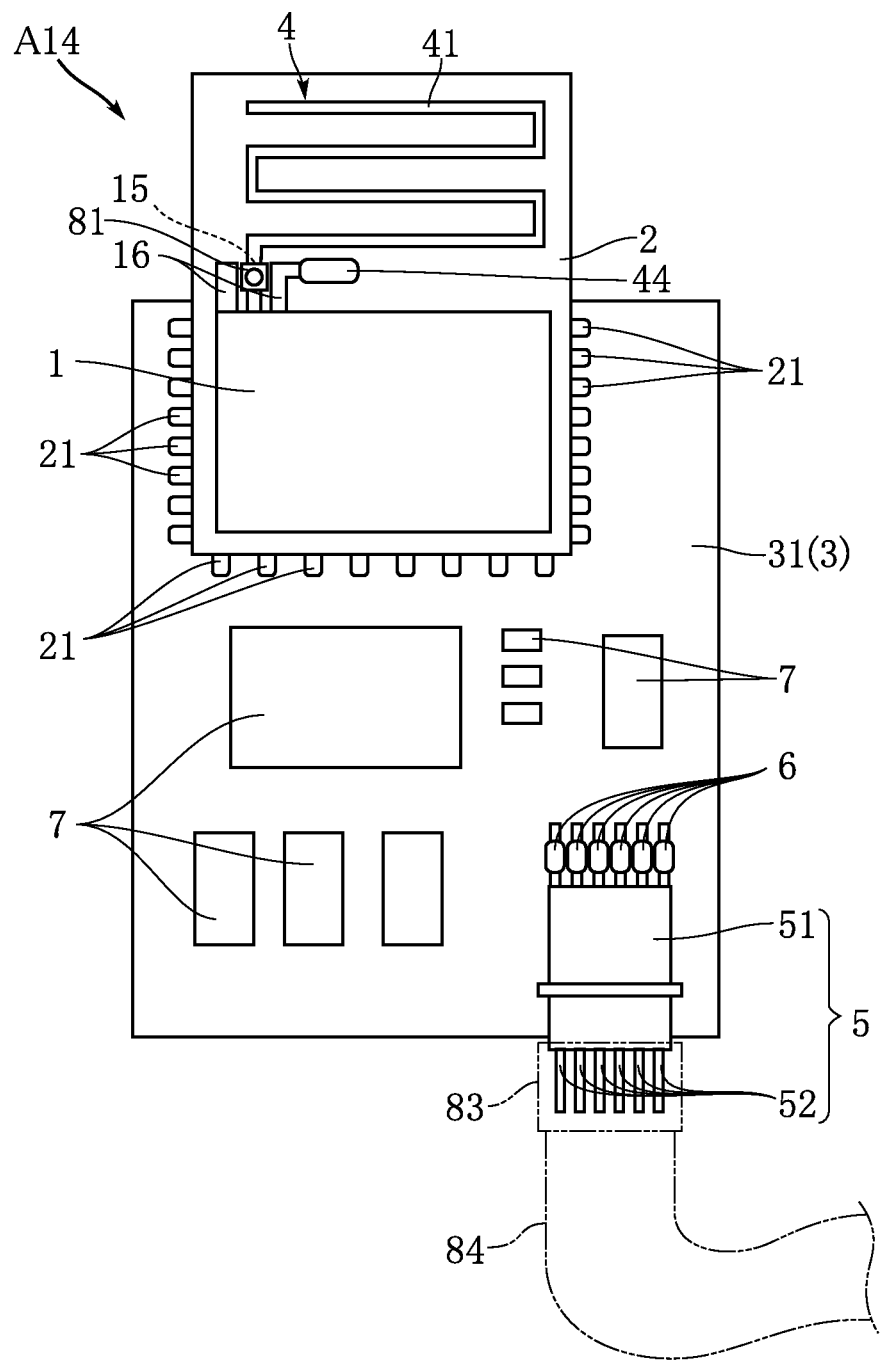
FIG. 24 is a plan view illustrating a wireless communications module based on a fourteenth embodiment of the present invention.

FIG. 24 illustrates a wireless communications module based on a fourteenth embodiment of the present invention. A wireless module A14 of the present embodiment is configured similarly to the above-described wireless module A1 except for the configuration of the antenna portion 4. Note that the plurality of inductors 6 may be configured similarly to the wireless module A2.

In the present embodiment, the antenna portion 4 is configured so as to include an inductor 44. One end of the inductor 44 is connected to the ground pattern 16, and is electrically connected to the ground pattern 16. On the other hand, the other end of the inductor 44 is not connected to anything. The inductor 44 includes a coil having a predetermined length inside thereof. Accordingly, the wireless module A14 is configured such that the coil (conductor) having the predetermined length is connected to one of the ground patterns 16. Also, in the present embodiment, the inductor 44 functions similarly to the conductor pattern 42 in the wireless modules A11 to A13.

According to such an embodiment as well, stable wireless communication can be performed by the wireless module A14.

Figure 25:
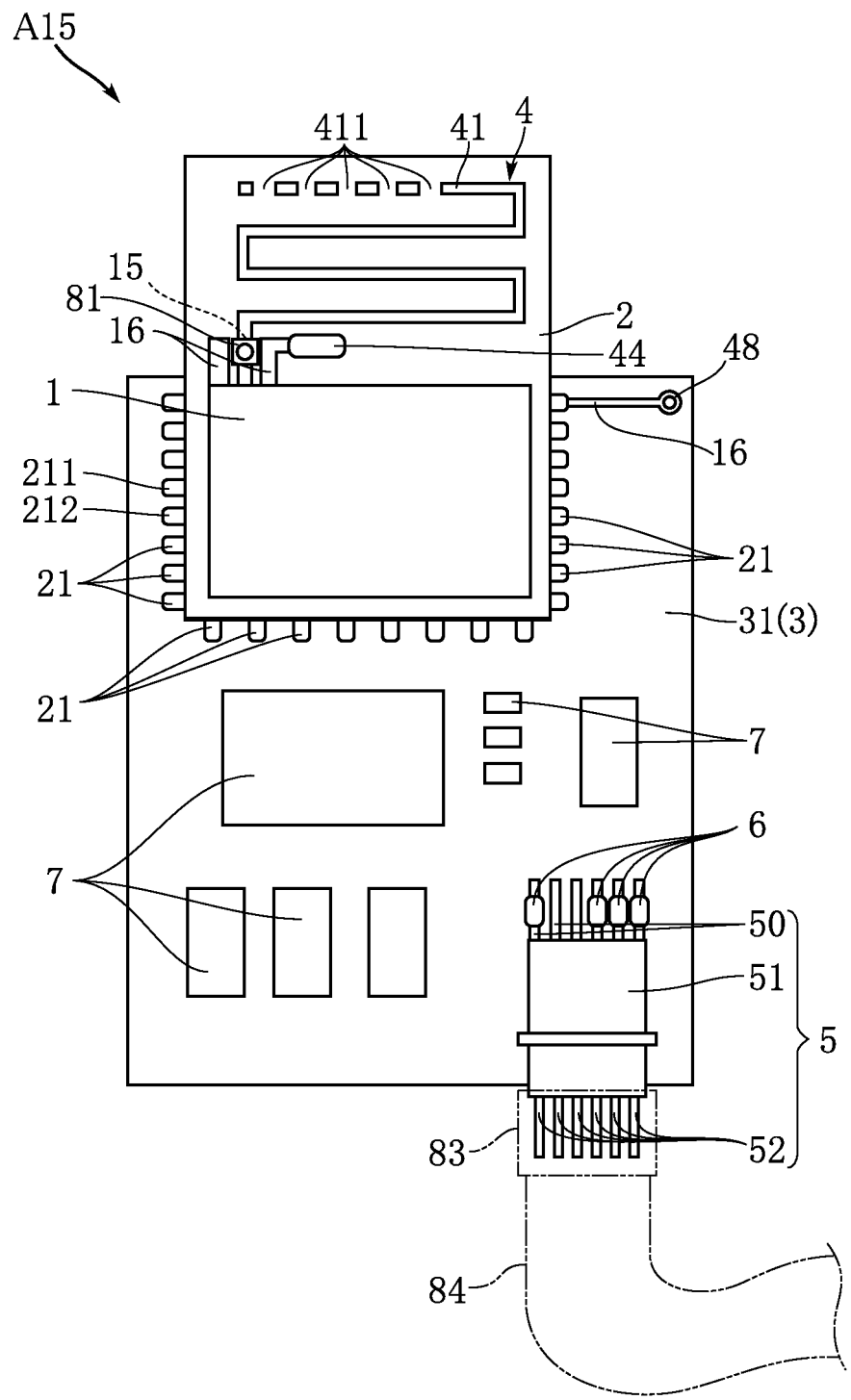
FIG. 25 is a plan view illustrating a wireless communications module based on a fifteenth embodiment of the present invention.
Figure 26:
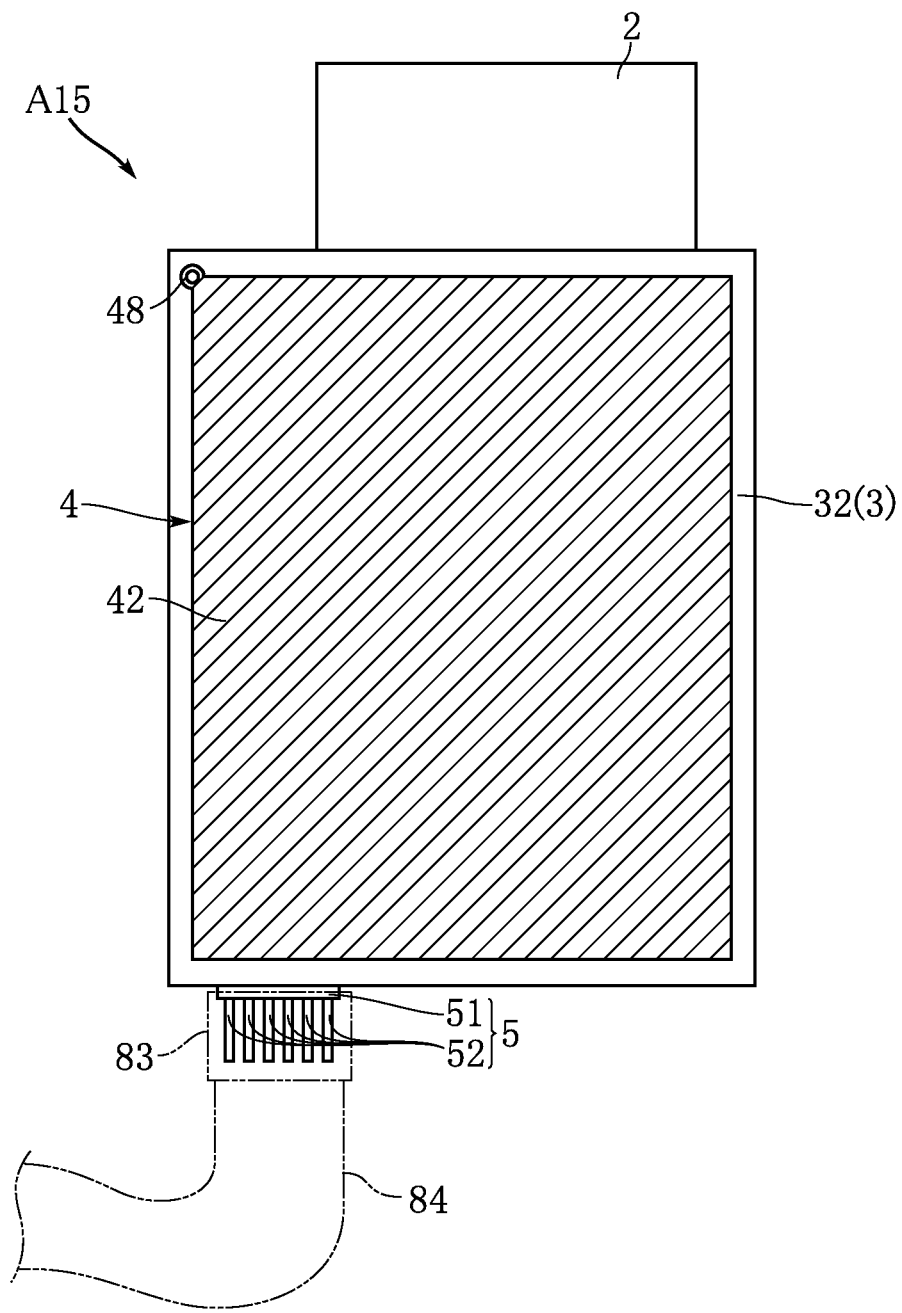
FIG. 26 is a bottom view illustrating the wireless communications module based on the fifteenth embodiment of the present invention.

FIGS. 25 and 26 illustrate a wireless module based on a fifteenth embodiment of the present invention. A wireless module A15 of the present embodiment mainly differs from the above-described embodiments in the arrangement of the plurality of inductors 6 and the configuration of the antenna portion 4.

The plurality of mounting terminals 21 of the wireless communication control unit 1 includes a transmission terminal 211 and a reception terminal 212. The transmission terminal 211 and the reception terminal 212 are arranged side by side on a left side of the wireless communication control unit 1 in the diagram in FIG. 25.

Figure 27:
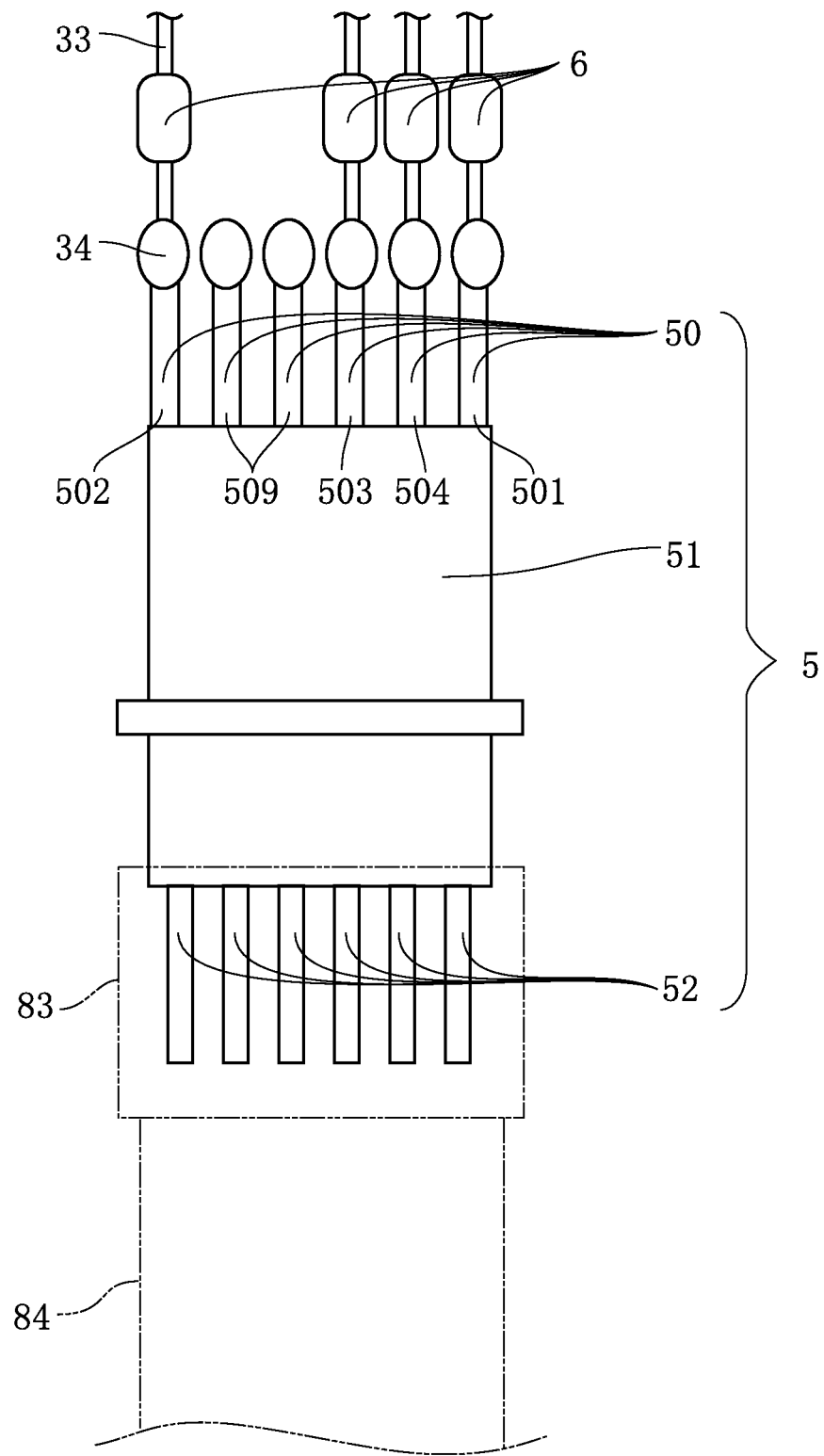
FIG. 27 is a plan view illustrating a main part of a connector portion of the wireless communications module based on the fifteenth embodiment of the present invention.

FIG. 27 is a plan view illustrating a main part of the connector portion 5. The connector portion 5 includes a plurality of internal connection terminals 50 that are respectively electrically connected to the plurality of external connection terminals 52. The plurality of internal connection terminals 50 include an internal connection terminal for power supply 501, an internal connection terminal for ground 502, an internal connection terminal for transmission 503, and an internal connection terminal for reception 504. The internal connection terminal for power supply 501 is connected to an external power supply line. The internal connection terminal for ground 502 is connected to a ground line. The internal connection terminal for transmission 503 is electrically connected to the transmission terminal 211 of the wireless communication control unit 1. The internal connection terminal for reception 504 is electrically connected to the reception terminal 212 of the wireless communication control unit 1.

The internal connection terminal for transmission 503 and the internal connection terminal for reception 504 are arranged between the internal connection terminal for power supply 501 and the internal connection terminal for ground 502. The internal connection terminal for transmission 503 is arranged closer to the internal connection terminal for ground 502, and the internal connection terminal for reception 504 is arranged closer to the internal connection terminal for power supply 501.

Also, the plurality of internal connection terminals 50 include two dummy internal connection terminals 509. Each dummy internal connection terminal 509 is not connected to the wireless communication control unit 1. The two dummy internal connection terminals 509 are arranged between the internal connection terminal for ground 502 and the internal connection terminal for transmission 503. Note that the number of the dummy internal connection terminals 509 may be one, or three or more.

The support substrate 3 includes a wiring portion 33 for appropriately electrically connecting mount components such as the wireless communication control unit 1 and the connector portion 25. The plurality of internal connection terminals 50 are joined to pad portions or the like of the wiring portion 33 by solders 34. A portion of the wiring portion 33 extends from each of the internal connection terminal for power supply 501, the internal connection terminal for ground 502, the internal connection terminal for transmission 503, and the internal connection terminal for reception 504, among the plurality of internal connection terminals 50.

The inductor 6 serving as the communication frequency removing element is attached to each of the portions of the wiring portion 33 that respectively extends from the internal connection terminal for power supply 501, the internal connection terminal for ground 502, the internal connection terminal for transmission 503, and the internal connection terminal for reception 504. These inductors 6 can be said to be arranged adjacent to the plurality of internal connection terminals 50 of the connector portion 25. Also, these inductors 6 can be said to be respectively arranged adjacent to the internal connection terminal for power supply 501, the internal connection terminal for ground 502, the internal connection terminal for transmission 503, and the internal connection terminal for reception 504. On the other hand, the inductors 6 are not arranged in positions adjacent to the two dummy internal connection terminals 509.

In the present embodiment, as shown in FIGS. 25 and 26, the antenna portion 4 includes the external antenna connection portion 81 and the conductor pattern 42 that is electrically connected to the wireless communication control unit 1 via the through-hole conductor portion 48.

Figure 28:
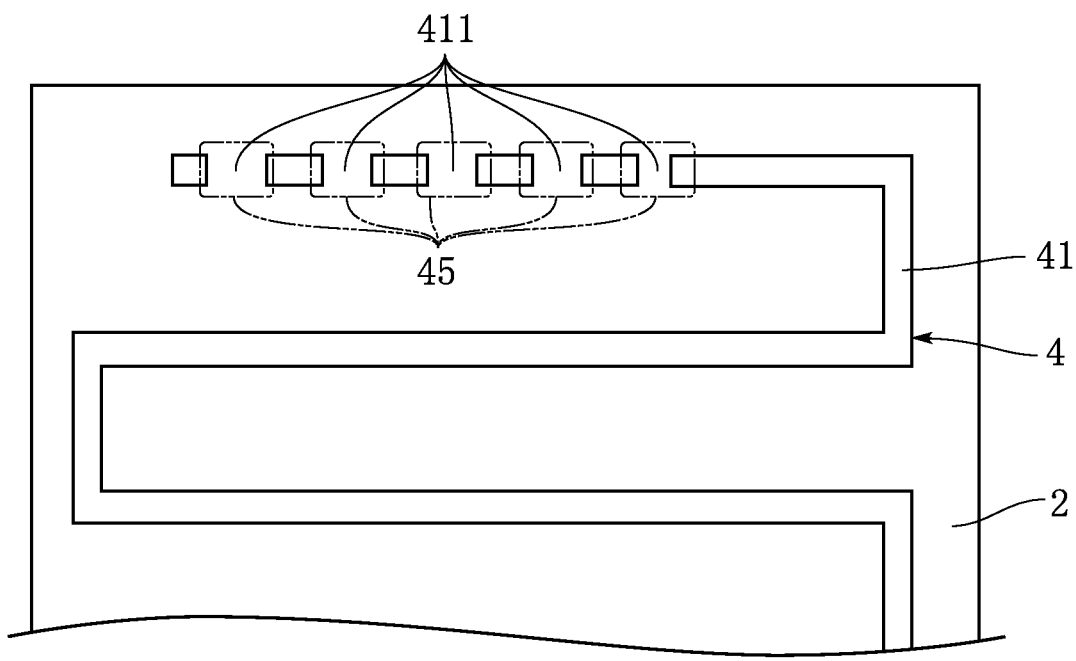
FIG. 28 is a plan view illustrating a main part of an antenna portion of the wireless communications module based on the fifteenth embodiment of the present invention.

FIG. 28 is a plan view illustrating a main part of the antenna portion 4. In the present embodiment, as shown in FIGS. 25 and 28, a plurality of discontinuous portions 411 are formed in the conductor pattern 41 of the antenna portion 4. Each discontinuous portion 411 is a portion where the band shaped conductor pattern 41 is partially removed and that cuts off electrical connection (electrical conduction in a length direction) between portions that are located before and after the discontinuous portion 411. In the present embodiment, the plurality of discontinuous portions 411 are arranged in a length direction of the conductor pattern 41.

It is intended that resistors 45 are to be mounted to the plurality of discontinuous portions 411, as shown in FIG. 28. As a result of the resistors 45 being mounted to portions across the respective discontinuous portions 411, the conductor length of the conductor pattern 41 is extended. Which of the discontinuous portions 411 are mounted by the resistors 45 is appropriately set depending on the wireless communication frequency or the like used in the wireless communication by the wireless communication control unit 1. Also, it is preferable that the resistor 45 used for such a purpose has extremely low resistance to a degree such that the resistance value thereof can almost be ignored relative to the resistance value of the conductor pattern 41.

According to such an embodiment as well, stable wireless communication can be performed by the wireless module A15. Also, as shown in FIG. 27, as a result of adopting an arrangement in which the internal connection terminal for transmission 503 and the internal connection terminal for reception 504 are interposed between the internal connection terminal for power supply 501 and the internal connection terminal for ground 502, leakage of noise from the internal connection terminal for transmission 503 and the internal connection terminal for reception 504 can be suppressed. Also, arranging the dummy internal connection terminals 509 between the internal connection terminal for ground 502 and the internal connection terminal for transmission 503 is preferable for further improving the effect of suppressing leakage of noise.

The conductor length of the conductor pattern 41 of the antenna portion 4 can be arbitrarily set according to the mounting manner of the resistors 45, as shown in FIG. 28. According to such a configuration, the conductor length of the conductor pattern 41 can be easily set to a length appropriate for the frequency of the wireless communication by the wireless communication control unit 1. Also, the conductor pattern 41 can be made in common in the case where a plurality of wireless communication control units 1 having different communication frequencies are manufactured, which is advantageous in reducing cost.

The wireless communications module according to the present invention is not limited to the above-described embodiments. Specific configurations of units of the wireless communications module according to the present invention can be variously designed and modified.

The invention claimed is:

1. A wireless communications module comprising:
a wireless communication control unit;
a wireless communication control unit substrate on which the wireless communication control unit is mounted, the substrate comprising a first edge extending in a first direction, a second edge opposite to the first edge, and a third edge extending between the first edge and the second edge in plan view;
an antenna portion connected to the wireless communication control unit;
a support substrate that includes an obverse surface and a reverse surface, the wireless communication control unit substrate being mounted on the obverse surface;
a plurality of first mounting terminals provided on the substrate and each crossing the first edge and protruding from the substrate beyond the first edge in plan view;
a plurality of second mounting terminals provided on the substrate and each crossing the second edge and protruding from the substrate beyond the second edge in plan view;
a plurality of third mounting terminals provided on the substrate and each crossing the third edge and protruding from the substrate beyond the third edge in plan view; and
a connector portion that includes a plurality of external connection terminals and a case that houses the plurality of external connection terminals,
wherein at least one of the plurality of external connection terminals and the wireless communication control unit are connected via a communication frequency component removing element,
the wireless communication control unit substrate comprises a first surface and a second surface opposite to the first surface,
the wireless communication control unit is disposed on the first surface of the wireless communication control unit substrate and exposed from the wireless communication control unit substrate,
each of the first, the second and the third mounting terminals is held in contact with the second surface of the wireless communication control unit substrate,
the antenna portion comprises a meandering conductive portion formed on the first surface of the wireless communication control unit substrate, the meandering conductive portion including a plurality of bends aligned along the first direction, and
an extension line of the second edge of the wireless communication control unit substrate extends through the connector portion in plan view.

2. The wireless communications module according to claim 1, wherein all of the plurality of external connection terminals and the wireless communication control unit are connected via communication frequency component removing elements.

3. The wireless communications module according to claim 1, wherein each communication frequency removing element is an inductor.

4. The wireless communications module according to claim 1, wherein the external connection terminals and each communication frequency removing element are connected without an electronic element being interposed.

5. The wireless communications module according to claim 1, wherein each communication frequency removing element is arranged adjacent to the connector portion.

6. The wireless communications module according to claim 1, further comprising an external antenna connection portion for connecting an external antenna.

7. The wireless communications module according to claim 6, wherein the antenna portion and the wireless communication control unit are insulated when the external antenna is connected to the external antenna connection portion.

8. The wireless communications module according to claim 1, wherein a maximum length of the wireless communication control unit substrate is smaller than a quarter of a communication wavelength of the wireless communication control unit.

9. The wireless communications module according to claim 1, wherein a maximum length of the support substrate is smaller than a quarter of a communication wavelength of the wireless communication control unit.

10. The wireless communications module according to claim 1, wherein the antenna portion includes a conductor pattern formed on the reverse surface of the support substrate.

11. The wireless communications module according to claim 10, wherein the conductor pattern is grounded.

12. The wireless communications module according to claim 11, wherein the antenna portion includes a through-hole conductor portion that passes through the support substrate in a thickness direction and is electrically connected to the conductor pattern.

13. The wireless communications module according to claim 12, wherein the conductor pattern is electrically connected only to a single part of the through-hole conductor portion.

14. The wireless communications module according to claim 11, wherein only the conductor pattern is formed on the reverse surface of the support substrate.

15. The wireless communications module according to claim 14, wherein the conductor pattern is similar in shape to the support substrate in plan view.

16. The wireless communications module according to claim 11, wherein the conductor pattern has a band shape.

17. The wireless communications module according to claim 16, wherein the conductor pattern includes a bent portion.

18. The wireless communications module according to claim 11, wherein the antenna portion includes an inductor having an end connected to the conductor pattern.

19. The wireless communications module according to claim wherein the connector portion includes a plurality of internal connection terminals that are electrically connected to the plurality of external connection terminals, respectively, and
each communication frequency removing element and the plurality of internal connection terminals are arranged close.

20. The wireless communications module according to claim 19, wherein the wireless communication control unit includes a transmission terminal for performing transmission in wireless communication and a reception terminal for performing reception in wireless communication, and
the plurality of internal connection terminals includes an internal connection terminal for transmission that is electrically connected to the transmission terminal, an internal connection terminal for reception that is electrically connected to the reception terminal, an internal connection terminal for power supply that is to be connected to an external power supply line, and an internal connection terminal for ground connected to a ground line.

21. The wireless communications module according to claim 20, wherein the communication frequency removing element is provided close to each of the internal connection terminal for transmission, the internal connection terminal for reception, the internal connection terminal for power supply, and the internal connection terminal for ground.

22. The wireless communications module according to claim 21, wherein the internal connection terminal for transmission and the internal connection terminal for reception are arranged between the internal connection terminal for power supply and the internal connection terminal for ground.

23. The wireless communications module according to claim 22, wherein the internal connection terminal for transmission is arranged close to the internal connection terminal for ground, and
the internal connection terminal for reception is arranged close to the internal connection terminal for power supply.

24. The wireless communications module according to claim 23, wherein the plurality of internal connection terminals include at least one dummy internal connection terminal that is not connected to the wireless communication control unit.

25. The wireless communications module according to claim 24, wherein the dummy internal connection terminal is arranged between the internal connection terminal for ground and the internal connection terminal for transmission.

26. The wireless communications module according to claim 25, wherein the plurality of internal connection terminals include a plurality of the dummy internal connection terminals.

27. The wireless communications module according to claim 1, wherein the antenna portion includes a conductor pattern having a band shape.

28. The wireless communications module according to claim 27, wherein the conductor pattern includes at least one discontinuous portion that cuts off electrical connection in a length direction of the conductor pattern.

29. The wireless communications module according to claim 28, further comprising a resistor for extending a conductor length of the conductor pattern by being mounted across the discontinuous portion.

30. The wireless communications module according to claim 1, wherein the wireless communication control unit substrate comprises a fourth edge along which no terminals are provided.

31. The wireless communications module according to claim 1, wherein the wireless communication control unit substrate is provided with a wiring pattern forming the antenna portion and with a pair of ground patterns, a part of the wiring pattern being disposed between the pair of ground patterns.

32. The wireless communications module according to claim 31, further comprising a feeding point to supply power to the antenna portion, wherein the feeding point is disposed at said part of the wiring pattern.

33. The wireless communications module according to claim 1, wherein the wireless communication control unit substrate comprises a first section of length and a second section of length that extend along the first edge and have a substantially same length, the first section of length being closer to the third edge than is the second section of length,
wherein a majority of the plurality of first mounting terminals are disposed along the first section of length.

34. The wireless communications module according to claim 33, wherein none of the plurality of first mounting terminals is disposed along the second section of length.

35. The wireless communications module according to claim 1, wherein the support substrate comprises an edge, the wireless communication control unit substrate overlaps with a part of the edge of the support substrate, and the wireless communication control unit substrate protrudes in the first direction from the support substrate beyond the edge of the support substrate in plan view.

36. The wireless communications module according to claim 1, wherein the antenna portion does not overlap with the support substrate in plan view.

37. The wireless communications module according to claim 1, wherein each of the first, the second and the third mounting terminals is an electroconductive plate having an obverse surface facing the wireless communication control unit substrate and a reverse surface facing the support substrate.

38. The wireless communications module according to claim 1, wherein a first interval between two adjacent ones of the plurality of first mounting terminals is different from a second interval between two adjacent ones of the plurality of third mounting terminals.

39. The wireless communications module according to claim 38, wherein the first interval is smaller than the second interval.

40. The wireless communications module according to claim 1, wherein the first edge of the wireless communication control unit substrate comprises a first portion overlapping with the support substrate in plan view and a second portion non-overlapping with the support substrate in plan view, wherein the plurality of first mounting terminals are disposed along the first portion of the first edge, and no terminals are disposed along the second portion of the first edge.

41. The wireless communications module according to claim 1, wherein the wireless communication control unit overlaps with the wireless communication control unit substrate and the support substrate.

42. A wireless communications module comprising:
- a first substrate including a first surface and a second surface opposite to the first surface, the first substrate having a rectangular shape elongated in a first direction in plan view;
- a control unit supported by the first surface of the first substrate, the control unit being smaller in size than the first substrate in plan view;
- a communications portion connected to the control unit and including a band-shaped conductive portion that is formed on the first surface of the first substrate and includes a plurality of bends aligned along the first direction; and
- a second substrate including a third surface and a fourth surface opposite to the third surface, the third surface faces in a same direction as the first surface of the first substrate,
- wherein the first substrate is provided on the third surface of the second substrate, and the first substrate overlaps with only a part of an edge of the second substrate and includes a protruding portion that protrudes in the first direction from the second substrate beyond the edge of the second substrate in plan view, the communications portion being disposed on the protruding portion.

43. The wireless communications module according to claim 42, wherein an entirety of the control unit overlaps with the first substrate.

44. The wireless communications module according to claim 42, further comprising at least one mounting terminal provided on the second surface of the first substrate to connect the control unit and the second substrate, wherein the control unit does not overlap with the mounting terminal in plan view.

45. The wireless communications module according to claim 42, wherein an area of the first substrate is smaller than an area of the second substrate when measured in plan view.

46. The wireless communications module according to claim 42, wherein the control unit overlaps with the first substrate and the second substrate in plan view.

47. The wireless communications module according to claim 42, wherein the second surface of the first substrate is spaced apart from the third surface of the second substrate in a normal direction perpendicular to the third surface.

48. The wireless communications module according to claim 47, further comprising at least one insulating post provided between the first substrate and the second substrate, wherein the first substrate is supported by the second substrate via the at least one insulating post.

49. The wireless communications module according to claim 42, wherein the first substrate comprises a base member made of an insulating material.

* * * * *